United States Patent
Yang et al.

(10) Patent No.: US 12,374,165 B2
(45) Date of Patent: Jul. 29, 2025

(54) PASSING CONTROL METHOD AND APPARATUS

(71) Applicant: SHENZHEN YINWANG INTELLIGENT TECHNOLOGIES CO., LTD., Shenzhen (CN)

(72) Inventors: Miao Yang, Beijing (CN); Mingchao Li, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/472,376

(22) Filed: Sep. 22, 2023

(65) Prior Publication Data

US 2024/0013578 A1    Jan. 11, 2024

Related U.S. Application Data

(63) Continuation of application No. PCT/CN2022/082441, filed on Mar. 23, 2022.

(30) Foreign Application Priority Data

Mar. 26, 2021 (CN) .......................... 202110325145.9

(51) Int. Cl.
G07B 15/06 (2011.01)
G07C 9/10 (2020.01)
G07C 9/21 (2020.01)

(52) U.S. Cl.
CPC ............. *G07B 15/063* (2013.01); *G07C 9/10* (2020.01); *G07C 9/21* (2020.01)

(58) Field of Classification Search
CPC ........ G07B 15/063; G07B 15/02; G07C 9/10; G07C 9/21; G07C 9/20; G06Q 20/18;

(Continued)

(56) References Cited

U.S. PATENT DOCUMENTS

| 7,567,919 | B1 * | 7/2009 | Koga | G08G 1/052 |
| | | | | 705/13 |
| 2008/0204278 | A1 * | 8/2008 | Tsuzuki | G07B 15/063 |
| | | | | 340/928 |

(Continued)

FOREIGN PATENT DOCUMENTS

| CN | 103491617 A | | 1/2014 | |
| CN | 106960592 A | * | 7/2017 | ............. G07B 15/04 |

(Continued)

OTHER PUBLICATIONS

Basha, G., & V, T. (2017). RSSI Based Implementation of Smart Tollgate Automation. International Journal of Innovative Research in Science, Engineering and Technology, 6(12), 22333. https://www.ijirset.com/upload/2017/december/22_Sadiq%20Basha_MSWord_N.pdf (Year: 2017).*

(Continued)

*Primary Examiner* — Shannon S Campbell
*Assistant Examiner* — Manal A. Alsamiri
(74) *Attorney, Agent, or Firm* — Fish & Richardson P.C.

(57) ABSTRACT

This disclosure provides methods and apparatuses for vehicle passing control on a toll road. In an implementation, a method performed by a roadside apparatus comprises: sending, to a vehicle at a first power, a payment inquiry message for requesting payment voucher information of the vehicle that has completed a payment of a toll for passing through a gate without actually passing through the gate, wherein the first power is less than a second power at which a payment interaction message is sent for collecting the toll from the vehicle, receive, from the vehicle, a payment response message corresponding to the payment inquiry message, wherein the payment response message comprises the payment voucher information, and generate, based on (Continued)

the payment response message, a passing control signal for controlling the gate to release the vehicle.

20 Claims, 18 Drawing Sheets

(58) Field of Classification Search
CPC .... G06Q 20/30; G06Q 20/308; G06Q 20/325; G06Q 2240/00; G06Q 20/14; G07F 17/24; G07F 17/244
See application file for complete search history.

(56) References Cited

U.S. PATENT DOCUMENTS

| | | | |
|---|---|---|---|
| 2009/0228350 A1* | 9/2009 | Robinson | G06Q 20/102 |
| | | | 705/40 |
| 2015/0169018 A1* | 6/2015 | Rogo | G06F 1/26 |
| | | | 701/2 |
| 2021/0360571 A1* | 11/2021 | Hwang | H04W 64/00 |
| 2022/0301356 A1* | 9/2022 | Bandi | G07B 15/063 |

FOREIGN PATENT DOCUMENTS

| | | |
|---|---|---|
| CN | 108805999 A | 11/2018 |
| CN | 109034780 A | 12/2018 |
| CN | 111415429 A | 7/2020 |

OTHER PUBLICATIONS

International Search Report and Written Opinion in International Appln. No. PCT/CN2022/082441, mailed on May 31, 2022, 17 pages (with English translation).

* cited by examiner

PASSING CONTROL METHOD AND APPARATUS

CROSS-REFERENCE TO RELATED APPLICATIONS

This application is a continuation of International Application No. PCT/CN2022/082441, filed on Mar. 23, 2022, which claims priority to Chinese Patent Application No. 202110325145.9, filed on Mar. 26, 2021. The disclosures of the aforementioned applications are hereby incorporated by reference in their entireties.

TECHNICAL FIELD

This application relates to the field of vehicle-to-everything, and in particular, to a passing control method and apparatus.

BACKGROUND

Road payment is a process in which a vehicle receives toll collection information released by a roadside unit and completes payment through vehicle-road interaction when the vehicle enters a toll collection area such as a road/bridge or a highway. During actual application, an on board unit (OBU) may be installed on the vehicle, and a road side unit (RSU) connected to a toll collection system may be deployed in the toll collection area. After the vehicle enters the toll collection area, a payment operation may be automatically performed after the on board unit and the road side unit complete mutual identity authentication.

Current road payment is mainly based on an electronic toll collection (ETC) system technology. However, reliability of the ETC technology is low, and a problem such as an identification error is likely to occur when the on board unit is located near a plurality of road side units. In addition, the ETC technology currently supports integrated circuit card (ICC) payment, which does not match quick response code and third-party electronic payment. Consequently, payment experience is affected. In addition, a communication range of the ETC technology is small. Generally, only one-to-one interaction with one vehicle can be performed within the communication range. Consequently, vehicle passing efficiency is affected.

A vehicle-to-everything (V2X) technology is characterized by a long communication distance, high communication reliability, and simultaneous interaction with a plurality of vehicles. Road payment based on the V2X technology can effectively improve reliability, payment efficiency, and vehicle passing efficiency.

Road payment scenarios may be classified into free-flow payment and non-free-flow payment. In the free-flow payment scenario, a vehicle completes imperceptible road payment without slowing down or stopping at a toll station in a driving process. In the non-free-flow payment scenario, a control bar is disposed at a gate of a toll station, and when a vehicle moves to the toll station, the vehicle needs to slow down or stop until the control bar is lifted. Currently, the road payment based on the V2X technology may be applied to the free-flow payment scenario. When the road payment based on the V2X technology is applied to the non-free-flow payment scenario, because a communication distance is long, and there are a plurality of vehicles in different transaction states in the communication range, the roadside unit is prone to fail to accurately lift the bar for a vehicle that has completed payment.

SUMMARY

In view of this, a passing control method and apparatus are proposed, so that reliable and efficient non-free-flow payment can be implemented based on a V2X technology.

According to a first aspect, an embodiment of this application provides a passing control method. The method is applied to a roadside unit. The method includes: sending a payment inquiry message to a vehicle at a first power, where the payment inquiry message is used to request payment voucher information of a vehicle that has completed payment but has not passed through a gate, the payment is to pay a toll used to pass through the gate, the first power is less than a second power at which a payment interaction message is sent, and the payment interaction message is used to collect the toll from the vehicle; receiving a payment response message fed back by the vehicle for the payment inquiry message, where the payment response message includes the payment voucher information; and generating a passing control signal based on the payment response message, where the passing control signal is used to control the gate to release the vehicle.

In this embodiment of this application, a payment procedure is completed based on the payment interaction message with a high power, so that the vehicle can complete the payment at a location far away from the gate. A payment completion time point is greatly advanced compared with a time point at which the vehicle arrives at the gate. Release confirmation is performed by using the payment inquiry message with a low power, so that when the vehicle that has paid a toll further moves to a location near the gate, the roadside unit can confirm that the vehicle has paid the toll, to enable the gate to release the vehicle that has paid the toll, and avoid releasing another vehicle that has not paid the toll or a vehicle of which payment status is not confirmed. This ensures vehicle passing efficiency, improves accuracy of releasing the vehicle, and implements reliable and efficient non-free-flow payment based on a V2X technology.

According to the first aspect, in a first possible implementation of the passing control method, the payment voucher information is a first toll collection voucher received after the vehicle pays the toll.

Before the receiving a payment response message, the method further includes: storing a second toll collection voucher.

The generating a passing control signal based on the payment response message includes: generating the passing control signal based on a determining result indicating that the first toll collection voucher is consistent with the second toll collection voucher.

In this embodiment of this application, consistency between the toll collection voucher stored before the payment response is received and the toll collection voucher obtained when the payment response message is received is determined, so that it can be determined whether the vehicle that is currently waiting to pass through the gate has completed the payment, to accurately determine whether to release the vehicle.

According to the first aspect, in a second possible implementation of the passing control method, the payment voucher information is a first vehicle identification number.

Before the receiving a payment response message, the method further includes: storing a second vehicle identification number.

The generating a passing control signal based on the payment response message includes: generating the passing control signal based on a determining result indicating that the first vehicle identification number is consistent with the second vehicle identification number.

In this embodiment of this application, consistency between the vehicle identification number stored before the payment response is received and the vehicle identification number obtained when the payment response message is received is determined, so that it can be determined whether the vehicle that is currently waiting to pass through the gate has completed the payment, to accurately determine whether to release the vehicle.

According to any one of the first aspect or the possible implementations of the first aspect, in a third possible implementation of the passing control method, the payment inquiry message includes at least one of a roadside device identifier, a toll station identifier, a gate identifier, or a random code.

According to the first aspect, or the first possible implementation or the second possible implementation of the first aspect, in a fourth possible implementation of the passing control method, the payment inquiry message includes a random code, and the payment response message includes the random code.

In this way, a fake payment response message sent by an on board unit can be identified, to improve reliability.

According to any one of the first aspect or the possible implementations of the first aspect, in a fifth possible implementation of the passing control method, after the generating a passing control signal, the method further includes: sending a release confirmation message to the vehicle.

In this way, the on board unit in the vehicle can stop sending the payment response message, to reduce resource consumption.

According to any one of the first aspect or the possible implementations of the first aspect, in a sixth possible implementation of the passing control method, the payment inquiry message is a broadcast message that is periodically sent.

In this way, after entering a communication range of the payment inquiry message, the vehicle can communicate with the roadside unit as soon as possible, to improve passing efficiency.

According to the sixth possible implementation of the first aspect, in a seventh possible implementation of the passing control method, a sending periodicity of the payment inquiry message is determined based on a road speed limit or a vehicle flow rate.

In this way, resource consumption and passing efficiency can be balanced.

According to any one of the first aspect or the possible implementations of the first aspect, in an eighth possible implementation of the passing control method, the method further includes:
  sending the payment interaction message to the vehicle at the second power, where the payment interaction message and the payment inquiry message are sent through frequency division or time division.

In this way, a single road side unit can send both the payment interaction message and the payment inquiry message.

According to any one of the first aspect or the possible implementations of the first aspect, in a ninth possible implementation of the passing control method, the roadside unit includes:

a road side unit, configured to send the payment inquiry message and send the payment interaction message;
  or
  a roadside system including a first road side unit configured to send the payment inquiry message, and a second road side unit configured to send the payment interaction message;
  or
  a first road side unit that is in the roadside system and that is configured to send the payment inquiry message.

According to a second aspect, an embodiment of this application provides a passing control method. The method is applied to an on board unit. The method includes: receiving a payment inquiry message from a roadside unit, where the payment inquiry message is used to request payment voucher information of a vehicle that has completed payment but has not passed through a gate, and the payment is to pay a toll used to pass through the gate; and sending a payment response message to the roadside unit based on the payment inquiry message, where the payment response message includes the payment voucher information.

In this embodiment of this application, an inquiry procedure is completed in response to the payment inquiry message with a low power, so that a vehicle that has completed the payment can smoothly pass through the gate when moving to a location close to the gate, and a vehicle that has not completed the payment cannot pass through the gate when moving to the location close to the gate. This ensures vehicle passing efficiency, and improves accuracy of releasing the vehicle, and implements reliable and efficient non-free-flow payment based on a V2X technology.

According to the second aspect, in a first possible implementation of the passing control method, the method further includes: receiving a toll collection voucher after the vehicle pays the toll, where the payment voucher information is the toll collection voucher.

According to the second aspect, in a second possible implementation of the passing control method, the payment voucher information is a vehicle identification number of the vehicle, and the method further includes: sending the vehicle identification number to the roadside unit after the vehicle pays the toll.

According to any one of the second aspect or the possible implementations of the second aspect, in a third possible implementation of the passing control method, the payment inquiry message includes at least one of a roadside device identifier, a toll station identifier, a gate identifier, or a random code.

According to the second aspect, or the first possible implementation or the second possible implementation of the second aspect, in a fourth possible implementation of the passing control method, the payment inquiry message includes a random code, and the payment response message includes the random code. In this way, reliability can be improved.

According to any one of the second aspect or the possible implementations of the second aspect, in a fifth possible implementation of the passing control method, the sending a payment response message is repeatedly sending the payment response message for a plurality of times, and the method further includes:
  receiving a release confirmation message from the roadside unit; and
  stopping sending the payment response message based on the release confirmation message.

According to a third aspect, an embodiment of this application provides a passing control apparatus. The apparatus is applied to a roadside unit. The apparatus includes:
  a sending module, configured to send a payment inquiry message to a vehicle at a first power, where the payment inquiry message is used to request payment voucher information of a vehicle that has completed payment but has not passed through a gate, the payment is to pay a toll used to pass through the gate, the first power is less than a second power at which a payment interaction message is sent, and the payment interaction message is used to collect the toll from the vehicle;

a receiving module, configured to receive a payment response message fed back by the vehicle for the payment inquiry message sent by the sending module, where the payment response message includes the payment voucher information; and a processing module, configured to generate a passing control signal based on the payment response message received by the receiving module, where the passing control signal is used to control the gate to release the vehicle.

According to the third aspect, in a first possible implementation of the passing control apparatus, the payment voucher information is a first toll collection voucher received after the vehicle pays the toll.

The apparatus further includes a storage module, configured to store a second toll collection voucher.

The processing module is further configured to generate the passing control signal based on a determining result indicating that the first toll collection voucher is consistent with the second toll collection voucher.

According to the third aspect, in a second possible implementation of the passing control apparatus, the payment voucher information is a first vehicle identification number.

The apparatus further includes a storage module, configured to store a second vehicle identification number.

The processing module is further configured to generate the passing control signal based on a determining result indicating that the first vehicle identification number is consistent with the second vehicle identification number.

According to any one of the third aspect or the possible implementations of the third aspect, in a third possible implementation of the passing control apparatus, the payment inquiry message includes at least one of a roadside device identifier, a toll station identifier, a gate identifier, or a random code.

According to the third aspect, or the first possible implementation or the second possible implementation of the third aspect, in a fourth possible implementation of the passing control apparatus, the payment inquiry message includes a random code, and the payment response message includes the random code.

According to any one of the third aspect or the possible implementations of the third aspect, in a fifth possible implementation of the passing control apparatus, the sending module is further configured to send a release confirmation message to the vehicle.

According to any one of the third aspect or the possible implementations of the third aspect, in a sixth possible implementation of the passing control apparatus, the payment inquiry message is a broadcast message that is periodically sent.

According to the sixth possible implementation of the third aspect, in a seventh possible implementation of the passing control apparatus, a sending periodicity of the payment inquiry message is determined based on a road speed limit or a vehicle flow rate.

According to any one of the third aspect or the possible implementations of the third aspect, in an eighth possible implementation of the passing control apparatus, the sending module is further configured to send the payment interaction message to the vehicle at the second power, where the payment interaction message and the payment inquiry message are sent through frequency division or time division.

According to any one of the third aspect or the possible implementations of the third aspect, in a ninth possible implementation of the passing control method, the roadside unit includes:

a road side unit, configured to send the payment inquiry message and send the payment interaction message;

or a roadside system including a first road side unit configured to send the payment inquiry message, and a second road side unit configured to send the payment interaction message;

or a first road side unit that is in the roadside system and that is configured to send the payment inquiry message.

According to a fourth aspect, an embodiment of this application provides a passing control apparatus. The apparatus is applied to an on board unit. The apparatus includes:

a receiving module, configured to receive a payment inquiry message from a roadside unit, where the payment inquiry message is used to request payment voucher information of a vehicle that has completed payment but has not passed through a gate, and the payment is to pay a toll used to pass through the gate; and a sending module, configured to send a payment response message to the roadside unit based on the payment inquiry message received by the receiving module, where the payment response message includes the payment voucher information.

According to the fourth aspect, in a first possible implementation of the passing control apparatus, the receiving module is further configured to receive a toll collection voucher after the vehicle pays the toll, where the payment voucher information is the toll collection voucher.

According to the fourth aspect, in a second possible implementation of the passing control apparatus, the payment voucher information is a vehicle identification number of the vehicle, and the sending module is further configured to send the vehicle identification number to the roadside unit after the vehicle pays the toll.

According to any one of the fourth aspect or the possible implementations of the fourth aspect, in a third possible implementation of the passing control apparatus, the payment inquiry message includes at least one of a roadside device identifier, a toll station identifier, a gate identifier, or a random code.

According to the fourth aspect, or the first possible implementation or the second possible implementation of the fourth aspect, in a fourth possible implementation of the passing control apparatus, the payment inquiry message includes a random code, and the payment response message includes the random code.

According to any one of the fourth aspect or the possible implementations of the fourth aspect, in a fifth possible implementation of the passing control apparatus, the sending a payment response message is repeatedly sending the payment response message for a plurality of times, and the receiving module is further configured to receive a release confirmation message from the roadside unit; and the sending module is further configured to stop sending the payment response message based on the release confirmation message.

According to a fifth aspect, an embodiment of this application provides a passing control apparatus. The passing control apparatus may perform the passing control method in one or more of the first aspect or the plurality of possible implementations of the first aspect.

According to a sixth aspect, an embodiment of this application provides a passing control apparatus. The passing control apparatus may perform the passing control method in one or more of the second aspect or the plurality of possible implementations of the second aspect.

According to a seventh aspect, an embodiment of this application provides a computer-readable storage medium. The computer-readable storage medium stores computer program instructions. When the computer program instructions are executed by a processor, the passing control method according to one or more of the first aspect or the plurality of possible implementations of the first aspect is implemented, or the passing control method according to one or more of the second aspect or the plurality of possible implementations of the second aspect is performed.

According to an eighth aspect, an embodiment of this application provides a computer program product. The computer program product includes computer-readable code. When the computer-readable code is run in a passing control apparatus, the passing control apparatus is enabled to perform the passing control method according to one or more of the first aspect or the possible implementations of the first aspect, or perform the passing control method according to one or more of the second aspect or the possible implementations of the second aspect.

These aspects and other aspects of this application are more concise and more comprehensive in descriptions of the following (a plurality of) embodiments.

BRIEF DESCRIPTION OF DRAWINGS

Accompanying drawings included in this specification and constituting a part of this specification and this specification jointly show example embodiments, features, and aspects of this application, and are intended to explain principles of this application.

DESCRIPTION OF EMBODIMENTS

Figure 1A:
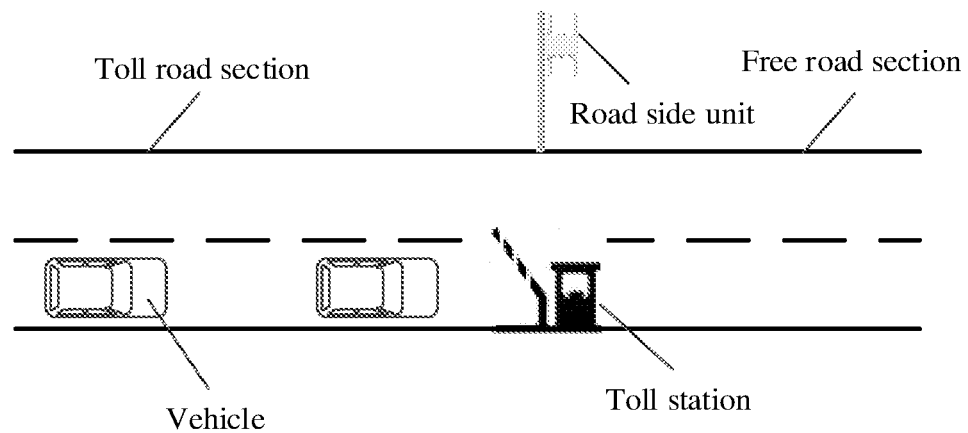
FIG. 1a is a schematic diagram of an example of an open non-free-flow payment scenario.

The following describes various example embodiments, features, and aspects of this application in detail with reference to the accompanying drawings. Identical reference numerals in the accompanying drawings indicate elements that have same or similar functions. Although various aspects of embodiments are illustrated in the accompanying drawing, the accompanying drawings are not necessarily drawn in proportion unless otherwise specified.

A specific term "example" herein means "used as an example, embodiment or illustration". Any embodiment described as "example" is not necessarily explained as being superior or better than other embodiments.

In addition, to better describe this application, numerous specific details are given in the following specific implementations. A person skilled in the art should understand that this application can also be implemented without some specific details. In some embodiments, methods, means, elements, and circuits that are well-known to a person skilled in the art are not described in detail, so that a subject matter of this application is highlighted.

Figure 1B:
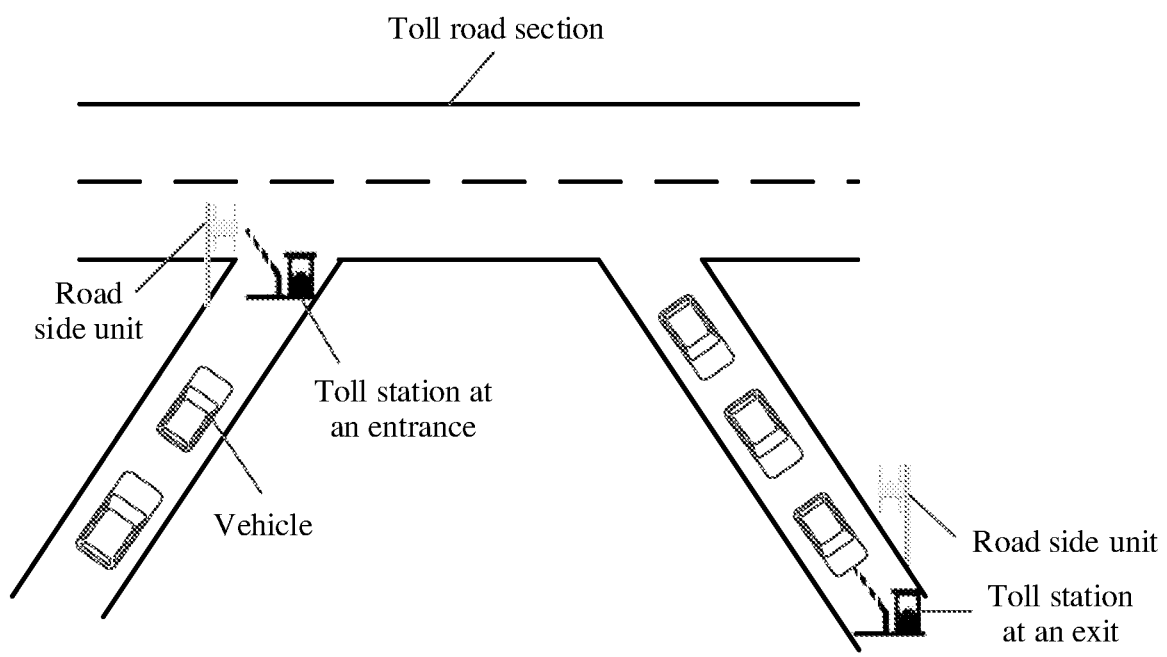
FIG. 1B is a schematic diagram of an example of a regional non-free-flow payment scenario.
Figure 1C:
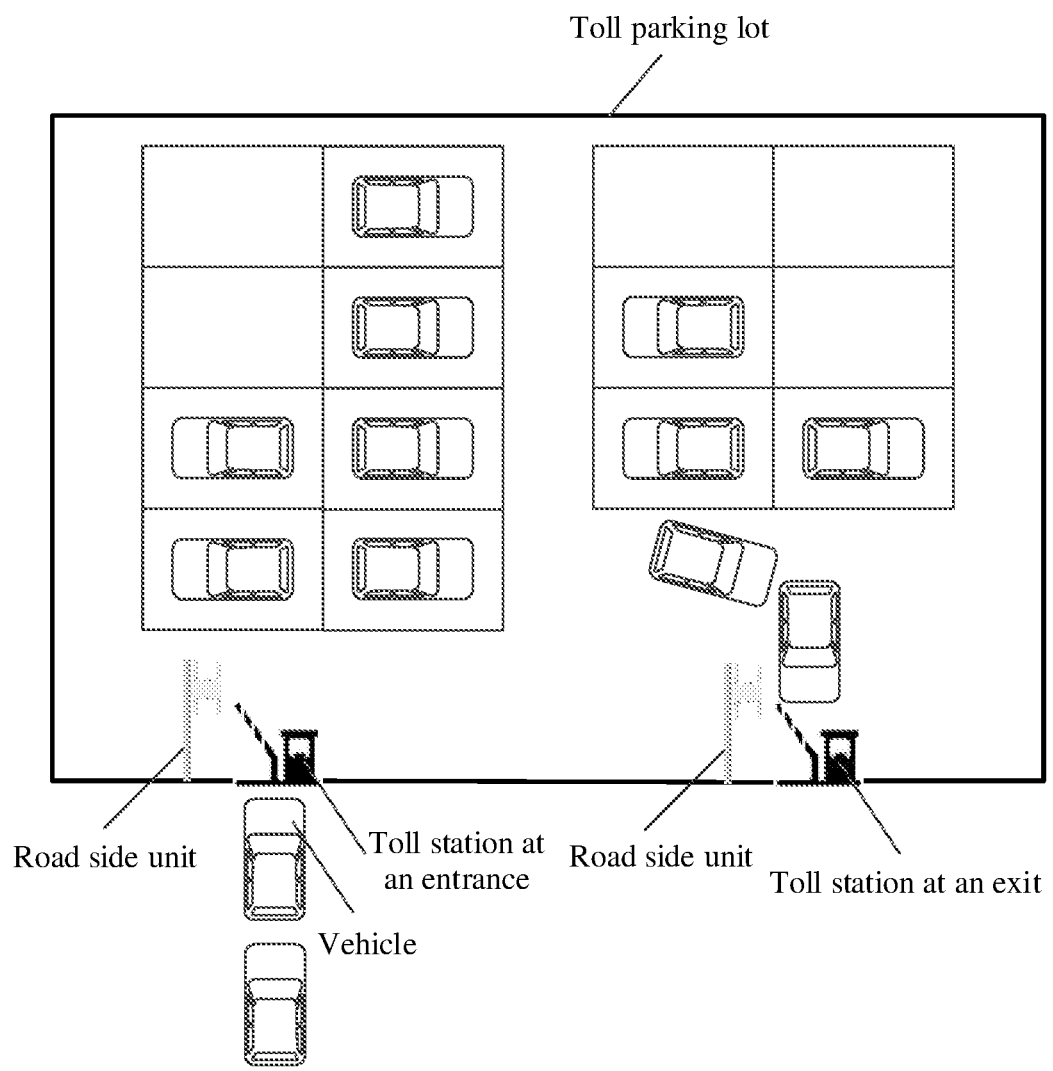
FIG. 1c is a schematic diagram of an example of a regional non-free-flow payment scenario.

In a non-free-flow payment scenario, a control bar is disposed at a gate of each lane of a toll station. When the control bar is lifted, it indicates that a vehicle is released in the gate, and the vehicle can pass through the toll station. The non-free-flow payment scenario may include an open non-free-flow payment scenario (for example, passing through a road or passing through a bridge) and a regional non-free-flow payment scenario (for example, a high-speed road section or a parking lot). FIG. 1a, FIG. 1B, and FIG. 1c each are a schematic diagram of an application scenario according to an embodiment of this application.

FIG. 1a is a schematic diagram of an example of an open non-free-flow payment scenario. As shown in FIG. 1a, a toll station is disposed at an exit of a toll road section. After confirming that the vehicle has completed payment, a road side unit at a toll station controls the gate to release the vehicle (that is, triggers a bar lifting operation) and allow the vehicle to leave the toll road section. During implementation, the toll station may alternatively be disposed at an entrance (not shown) of the toll road section, or at another location (for example, a location 5 km away from the entrance, or a location at the middle of the toll road section, which is not shown) in the toll road section.

FIG. 1B is a schematic diagram of an example of a regional non-free-flow payment scenario. As shown in FIG. 1B, a toll station is disposed at an entrance and an exit of a toll road section. At the toll station at the entrance, after confirming that the vehicle has completed payment (generally, a toll paid at the entrance is 0), a road side unit controls the gate to release the vehicle and allow the vehicle to enter the toll road section. At the toll station at the exit, after confirming that the vehicle has completed the payment, the road side unit controls the gate to release the vehicle and allow the vehicle to leave the toll road section.

FIG. 1c is a schematic diagram of an example of a regional non-free-flow payment scenario. As shown in FIG. 1c, a toll station is disposed at an entrance and an exit of a toll parking lot. At the toll station at the entrance, after confirming that the vehicle has completed payment (generally, a toll paid at the entrance is 0), a road side unit controls the gate to release the vehicle and allow the vehicle to enter the parking lot. At the toll station at the exit, after confirming that the vehicle has completed the payment, the road side unit controls the gate to release the vehicle and allow the vehicle to leave the parking lot.

The passing control method provided in this embodiment of this application may be further applied to another non-free-flow payment scenario, for example, passing through a tunnel or taking a ferry. This is not limited in this application.

Figure 2A:
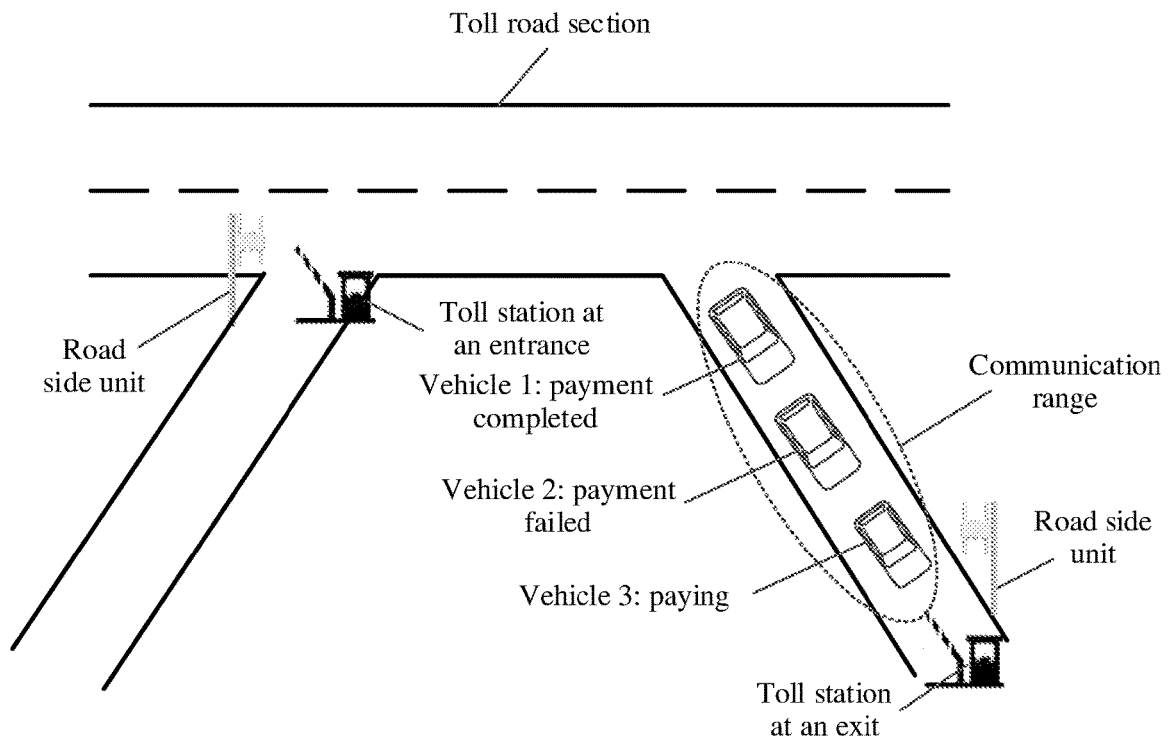
FIG. 2a is a schematic diagram of a communication range of a road side unit.

A vehicle-to-everything (V2X) technology has features of a long communication distance, high communication reliability, and supporting for simultaneous interaction with a plurality of vehicles. Therefore, in non-free-flow payment based on the V2X technology, transaction states of the plurality of vehicles in a communication range of a road side unit (RSU) may be different (for example, some vehicles have completed the payment, some vehicles are performing payment but have not completed payment, and some vehicles fail to perform payment). In this case, the road side unit cannot accurately trigger a bar lifting operation because a transaction status of a vehicle waiting to pass at the gate cannot be distinguished. FIG. 2a is a schematic diagram of a communication range of a road side unit. As shown in FIG. 2a, at a toll station at an exit of a toll road section, there are three vehicles in the communication range of the road side unit: a vehicle 1, a vehicle 2, and a vehicle 3. The vehicle 1 has completed payment, the vehicle 2 fails to perform payment, and the vehicle 3 is performing payment and has not completed the payment (in other words, the payment is being performed). When the vehicle 3 moves to the gate of the toll station, because the road side unit cannot distinguish whether a vehicle waiting to pass before a control bar is the vehicle 1, the vehicle 2, or the vehicle 3, the road side unit cannot accurately trigger the bar lifting operation.

Figure 2B:
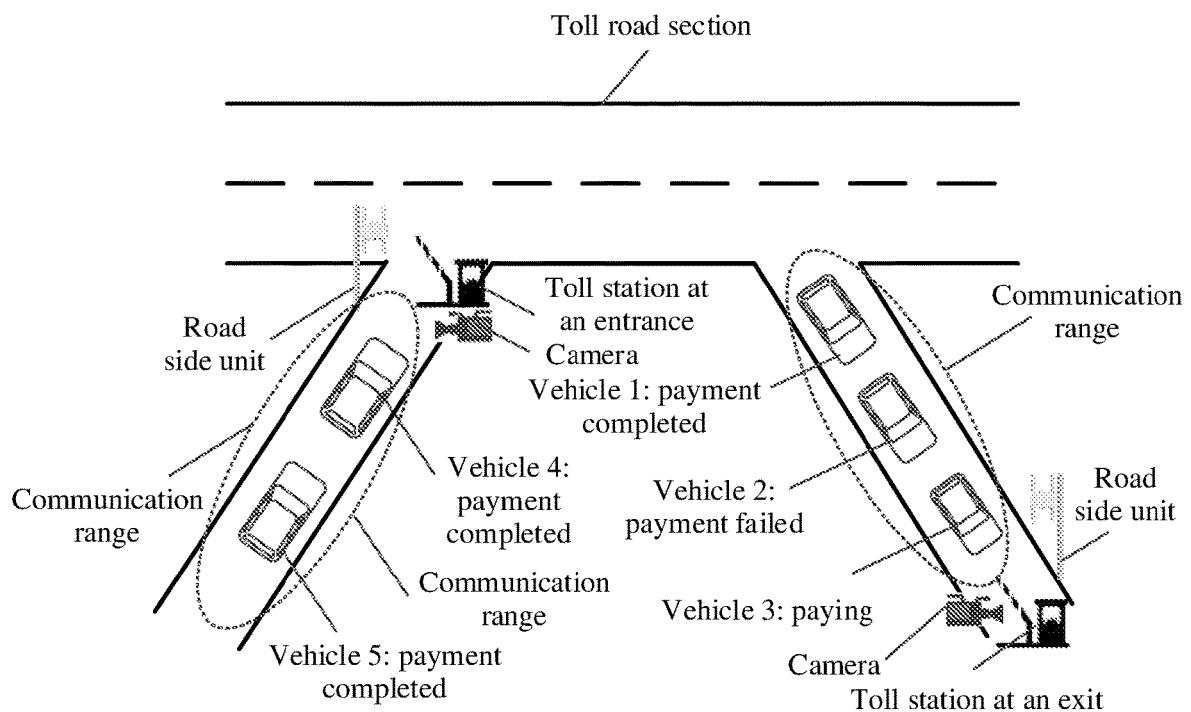
FIG. 2b is a schematic diagram of a scenario in which non-free-flow payment is implemented based on a V2X technology in a related technology.

In a related technology, one manner is to implement non-free-flow payment by combining the V2X technology and a camera. The road side unit and the camera are connected to a background server of the toll station. Before the vehicle moves to the control bar at the gate, the vehicle completes a payment procedure with the road side unit by using the V2X technology. Vehicle information is recorded in the background server. When the vehicle moves to the control bar at the gate, the camera takes a photo of a license plate of the vehicle and identifies a license plate number. The background server performs inquiry and verification on the identified license plate number based on the recorded vehicle information. After confirming that the vehicle in front of the camera has completed the payment, the control bar is lifted to release the vehicle. FIG. 2b is a schematic diagram of a scenario in which non-free-flow payment is implemented based on a V2X technology in a related technology. Compared with FIG. 1B, in FIG. 2b, a camera is added to each of the toll station at the entrance and the toll station at the exit. As shown in FIG. 2b, at the toll station at the entrance, there are two vehicles in the communication range of the road side unit: a vehicle 4 and a vehicle 5. Currently, the vehicle 4 and the vehicle 5 have completed the payment. When the vehicle 4 moves to the toll station at the entrance, the camera at the toll station takes a photo of a license plate of the vehicle 4, identifies a license plate number of the vehicle 4, and uploads the license plate number of the vehicle 4 to the background server. The background server confirms, based on recorded vehicle information, that the vehicle 4 has completed the payment, and the bar is lifted to release the vehicle. Then, the vehicle 3 moves to the toll station at the entrance, the background server also confirms that the vehicle 3 has completed the payment, and the bar is lifted to release the vehicle. As shown in FIG. 2b, at the toll station at the exit, there are three vehicles in the communication range of the road side unit: the vehicle 1, the vehicle 2, and the vehicle 3. Currently, the vehicle 1 has completed the payment, the vehicle 2 fails to perform payment, and the vehicle 3 is performing payment and has not completed the payment. When the vehicle 3 moves to the toll station at the exit, the background server confirms that the vehicle 3 does not complete the payment, and the vehicle 3 is not released to pass. After the vehicle 3 completes the payment, the background server lifts the bar to release the vehicle. Then, when the vehicle 2 moves to the toll station at the exit, the background server confirms that the vehicle 2 does not complete the payment, and the vehicle 2 is not released to pass either. After the vehicle 2 completes the payment, the background server lifts the bar to release the vehicle. Then, the vehicle 1 moves to the toll station at the exit, the background server confirms that the vehicle 3 has completed the payment, and the bar is lifted to release the vehicle.

This manner greatly depends on the identification of the license plate number by the camera. In a scenario with a poor light condition such as night or fog, a correct rate of the identification of license plates by the camera decreases, which affects reliability and effectiveness of a system. In addition, this manner requires two types of devices: a V2X system and a camera. Therefore, system integration complexity is increased, and deployment costs are also increased.

Figure 2C:
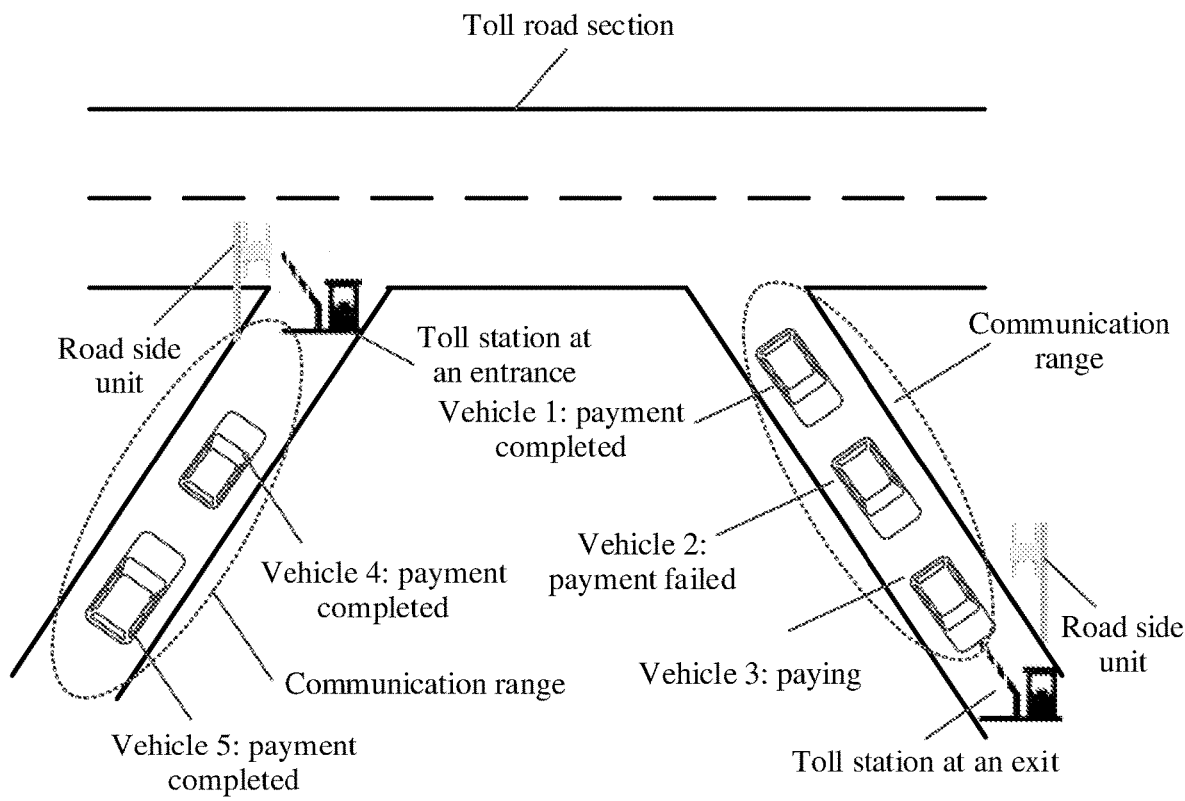
FIG. 2c is a schematic diagram of a scenario in which non-free-flow payment is implemented based on a V2X technology in a related technology.

In a related technology, another manner is to implement non-free-flow payment by combining the V2X technology and a vehicle positioning technology. Before the vehicle moves to the control bar, the vehicle completes a payment procedure with the road side unit by using the V2X technology. Vehicle information is recorded in a background server. After completing the payment, the vehicle continues to send real-time location information of the vehicle to the road side unit by using the V2X technology. The road side unit identifies a distance between the vehicle and the control bar at the gate of the toll station based on the real-time location information sent by the vehicle. If the vehicle moves to a location of the control bar (for example, a distance between the vehicle and the control bar is less than 1 meter), and it is confirmed, based on a record in the background server, that the vehicle has completed the payment, the road side unit may trigger the bar lifting operation, and releases the vehicle. If the vehicle moves to the location of the control bar, and it is confirmed, based on a record in the background server, that the vehicle does not complete the payment, the road side unit may not trigger the bar lifting operation, and does not release the vehicle. FIG. 2c is a schematic diagram of a scenario in which non-free-flow payment is implemented based on a V2X technology in a related technology. As shown in FIG. 2c, at a toll station at an entrance, there are two vehicles in the communication range of the road side unit: a vehicle 4 and a vehicle 5. After completing the payment, the vehicle 4 and the vehicle 5 continue to send real-time location information to the road side unit. When determining that the vehicle 4 moves to the control bar of the toll station at the entrance, the road side unit confirms, based on the information recorded in the background server, that the vehicle 4 completes the payment, and triggers the bar lifting operation. As shown in FIG. 2c, at a toll station at an exit, there are three vehicles in the communication range of the road side unit: the vehicle 1, the vehicle 2, and the vehicle 3. Currently, the vehicle 1 has completed the payment, the vehicle 2 fails to perform payment, and the vehicle 3 is performing payment and has not completed the payment. Because the vehicle 3 has not completed the payment, when the vehicle 3 moves to the control bar of the toll station at the exit, the road side unit may not trigger the bar lifting operation, and the vehicle 3 cannot pass.

This manner greatly depends on precision of a navigation positioning system of a vehicle and strength of a global navigation satellite system (GNSS) signal. When the precision of a vehicle-mounted navigation positioning device is insufficient or the GNSS signal is weak, the distance between the vehicle and the control bar cannot be accurately determined, and consequently, a bar lifting determining error is caused. At a toll station, a gas station, or some urban scenarios, the GNSS signal is weak due to building blocking. Although a high-precision navigation and positioning device is installed on a vehicle, the vehicle may fail to search for four satellites for positioning.

Embodiments of this application provide a passing control method. In a case without adding a camera or depending on a positioning device, whether a vehicle that is waiting to pass before a control bar at a gate has completed payment a toll is accurately identified, to accurately control the control bar, and accurately release a vehicle, so as to implement reliable and efficient non-free-flow payment based on a V2X technology.

In the passing control method provided in this embodiment of this application, a roadside unit sends at least two types of V2X messages to the vehicle, to be specific, a payment interaction message and a payment inquiry message. At least two interaction procedures are involved between the roadside unit and the vehicle, to be specific, a payment procedure and an inquiry procedure. In the payment procedure, a V2X message sent by the roadside unit to the vehicle may be referred to as the payment interaction message. In the inquiry procedure, a V2X message sent by the roadside unit to the vehicle may be referred to as the payment inquiry message.

The payment is to pay a toll used to pass through the gate. The payment interaction message may be used to collect the toll from the vehicle. The payment inquiry message may be used to request payment voucher information of a vehicle that has completed payment but has not passed through the gate. In this embodiment of this application, a message fed back by the vehicle for the payment interaction message may be referred to as an interaction response message, and a message fed back by the vehicle for the payment inquiry message may be referred to as a payment response message. The payment response message includes the payment voucher information requested by the payment inquiry message.

In an implementation, the roadside unit sends the payment inquiry message to the vehicle at a first power, and sends the payment interaction message to the vehicle at the second power, and the first power is less than the second power. Because a communication range of a V2X message is positively correlated with a transmit power of the V2X message, that is, a larger transmit power of the V2X message indicates a larger communication range of the V2X message, and a smaller transmit power of the V2X message indicates a smaller communication range of the V2X message. Therefore, a communication range of the payment inquiry message is smaller than a communication range of the payment interaction message.

Figure 3A:
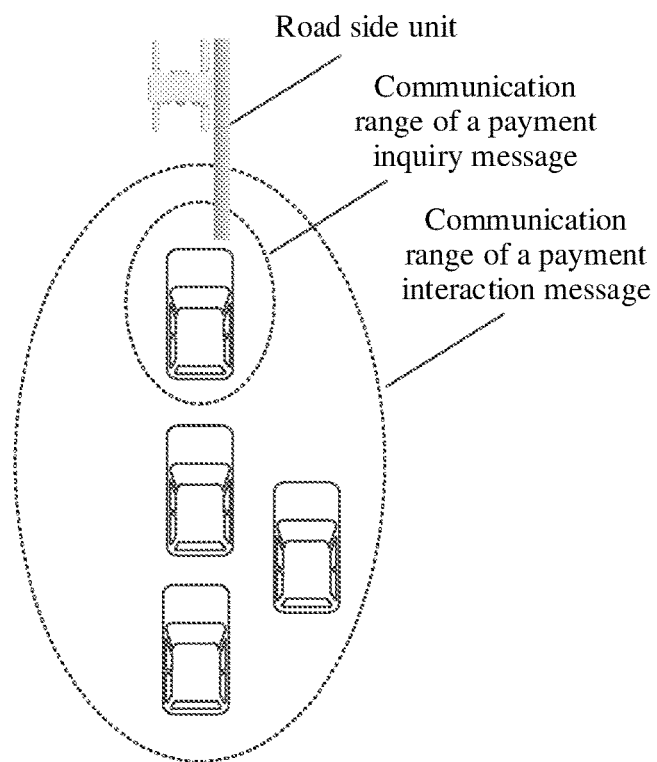
FIG. 3a is a schematic diagram of a communication range of a V2X message sent by a roadside unit according to an embodiment of this application.

FIG. 3a is a schematic diagram of a communication range of a V2X message sent by a roadside unit according to an embodiment of this application. As shown in FIG. 3a, the communication range of the payment inquiry message is smaller than the communication range of the payment interaction message. In an example, a value range of a coverage radius of the payment inquiry message may be [5 m, 10 m], and a value range of a coverage radius of the payment interaction message is [200 m, 300 m]. It can be learned that the communication range of the payment inquiry message may usually accommodate one vehicle, and the roadside unit interacts with only one vehicle close to the control bar of the gate by sending the payment inquiry message, to ensure accuracy of releasing the vehicle. The communication range of the payment interaction message may usually accommodate a plurality of vehicles, and the roadside unit may simultaneously interact with the plurality of vehicles in the communication range of the payment interaction message by using the payment interaction message, to improve payment efficiency.

In an implementation, the transmit power of the V2X message may be configured and controlled by a higher layer parameter. According to a technical requirement of a roadside device technology of the vehicle-to-everything wireless communication technology based on a Long Term Evolution-Vehicle-to-Everything (LTE-V2X) technology, it may be determined that currently, in the V2X technology, a maximum transmit power of a road side unit of the roadside unit is 23 dBm. Therefore, in this embodiment of this application, a maximum value of the transmit power (that is, the second power) of the payment interaction message may be set to 23 dBm. It may be determined based on the 3GPP TS36.101 protocol standard that a minimum value of the transmit power (that is, the second power) of the payment interaction message may be set to −30 dBm. In other words, in this embodiment of this application, a power adjustment range (that is, an adjustment range of the second power) of the payment interaction message may be configured as [−30 dBm, 23 dBm].

In an implementation, the transmit power (that is, the first power) of the payment inquiry message may be determined based on the transmit power of the road side unit of the roadside unit, a transmit antenna gain of the road side unit, a receive antenna gain of the road side unit, a receiver sensitivity of an on board unit, and a preset bar lifting identification distance. For example, the transmit power of the payment inquiry message may be −85 dBm, −75 dBm, or the like.

In an example, the transmit power of the payment inquiry message may be obtained according to a formula (1).

$$Pt=Sr+PL(d)-Gt-Gr \qquad \text{Formula 1.}$$

Herein, Pt indicates the transmit power of the payment inquiry message, and a unit is dBm; Sr indicates the receiver sensitivity of the on board unit, and a unit is dBm; PL(d) indicates a path loss when the distance is d, and a unit is dB, where d indicates the preset bar lifting identification distance; Gt indicates the transmit antenna gain of the road side unit, and a unit is dB; and Gr indicates the receive antenna gain of the road side unit, and a unit is dB. Sr, PL(d), Gt, and Gr may be obtained through actual measurement, and d may be determined based on positions of the road side unit and the control bar. It should be noted that, in an actual case, a factor such as a cable loss further needs to be considered, and an actually used transmit power of the payment inquiry message may be slightly greater than the transmit power obtained according to the formula (1).

According to the passing control method provided in this embodiment of this application, there may be two cases based on the roadside device involved in the roadside unit. In Case 1, the payment inquiry message and the payment interaction message are sent by a single roadside device, so that the single roadside device completes the payment procedure and the inquiry procedure. In Case 2, the payment inquiry message and the payment interaction message are sent by two different roadside devices, so that the two roadside device systems complete the payment procedure and the inquiry procedure. In a possible implementation of Case 2, the roadside unit provided in this embodiment of this application may be a roadside system including two roadside devices. The two roadside devices in the roadside system respectively send the payment inquiry message and the payment interaction message, to collaboratively complete the payment procedure and the inquiry procedure. In another possible implementation of Case 2, the roadside unit provided in this embodiment of this application may be the roadside device that is in the roadside system and that is configured to send the payment inquiry message.

Figure 4A:
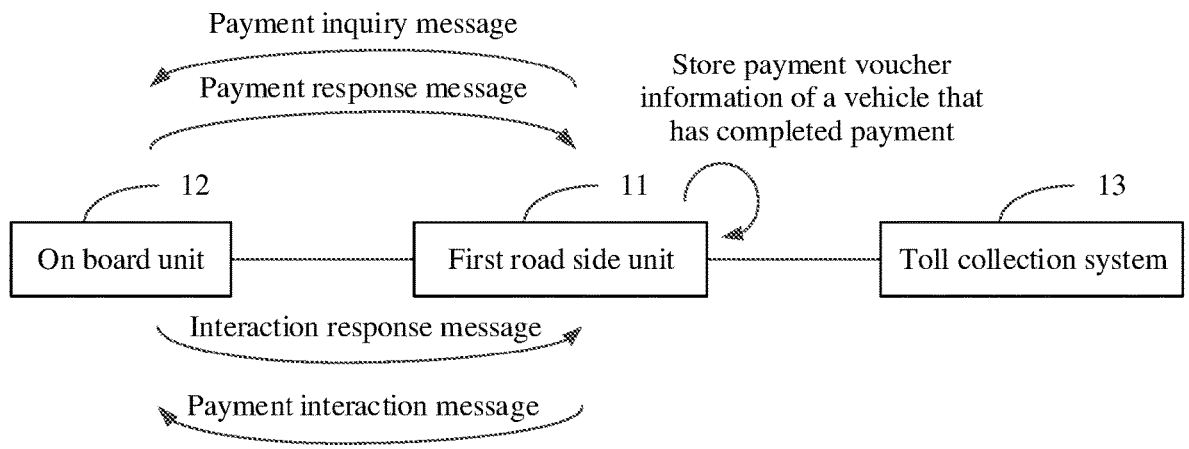
FIG. 4a is a schematic diagram of an architecture of a passing control system according to an embodiment of this application.

The following describes Case 1 in detail. In Case 1, the payment inquiry message and the payment interaction message are sent by a same roadside device. In other words, the roadside device needs to send the payment inquiry message to the vehicle at the first power, and send the payment interaction message to the vehicle at the second power. FIG. 4a is a schematic diagram of an architecture of a passing control system according to an embodiment of this application. As shown in FIG. 4a, the passing control system may include a first road side unit 11, an on board unit 12, and a toll collection system 13. The first road side unit 11 is the roadside device, and the on board unit 12 is a device in the vehicle. The roadside unit provided in this embodiment of this application may be the first road side unit 11.

As shown in FIG. 4a, the first road side unit 11 may send the payment interaction message to the on board unit 12 at the second power, interact with the toll collection system 13 based on an interaction response message returned by the on board unit 12, and locally record payment voucher information of a vehicle that has completed payment. The first road side unit 11 may further send the payment inquiry message to the on board unit 12 at the first power, and determine, based on a payment response message returned by the on board unit 12 and the locally recorded payment voucher information, whether to control the gate to release the vehicle.

In an implementation, the payment inquiry message and the payment interaction message may be broadcast messages that are periodically sent. In other words, the first road side unit 11 may periodically broadcast the payment inquiry message and the payment interaction message, so that the on board unit 12 detects a signal in time and performs interaction.

In this embodiment of this application, the payment inquiry message and the payment interaction message are sent through frequency division or time division, so that the single road side unit can send the payment inquiry message and the payment interaction message.

Figure 3B:
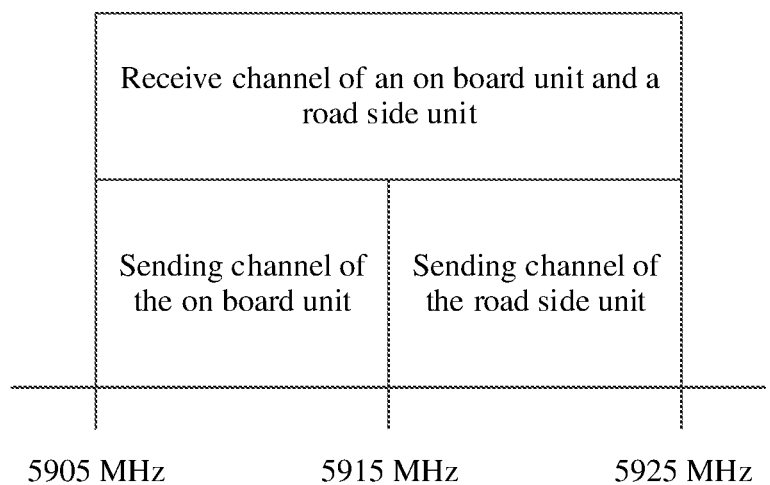
FIG. 3b is a schematic diagram of sending a payment inquiry message and a payment interaction message in frequency domain.

In a possible implementation, in this embodiment of this application, a sending channel and a sending interval of each of the payment inquiry message and the payment interaction message are designed as follows:

In frequency domain, the sending channel of the road side unit is different from the sending channel of the on board unit, and signals of the road side unit and the on board unit are received in an entire operating frequency band. Therefore, in this embodiment of this application, both the payment inquiry message and the payment interaction message are sent on a specified same channel of the road side unit. FIG. 3b is a schematic diagram of sending a payment inquiry message and a payment interaction message in frequency domain. As shown in FIG. 3b, in an example, the payment inquiry message and the payment interaction message may be sent on a channel of a frequency from 5915 MHz to 5925 MHz. Certainly, the payment inquiry message and the payment interaction message may alternatively be sent on a channel of another frequency. This is not limited in this application.

In time domain, a power of the V2X message may be adjusted based on a timeslot of a subframe of 1 ms. In other words, the power of the V2X message may change at an interval of 1 ms, and a sending time interval between the payment inquiry message and the payment interaction message may be adjusted based on 1 ms. The road side unit may send the payment inquiry message and the payment interaction message in a same periodicity, or may send the payment inquiry message and the payment interaction message in different periodicities. The road side unit may send the payment inquiry message and the payment interaction message at an equal interval, or may send the payment inquiry message and the payment interaction message at different intervals.

Figure 3C:
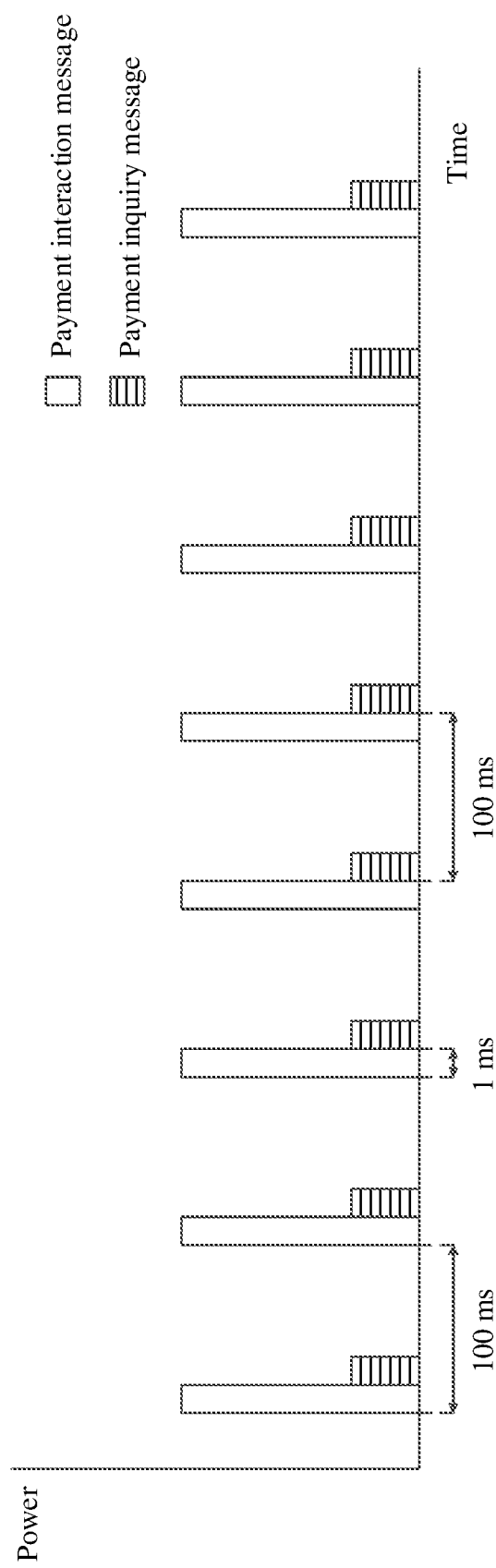
FIG. 3c to FIG. 3g each are a schematic diagram of an example of sending a payment inquiry message and a payment interaction message in time domain.
Figure 3D:
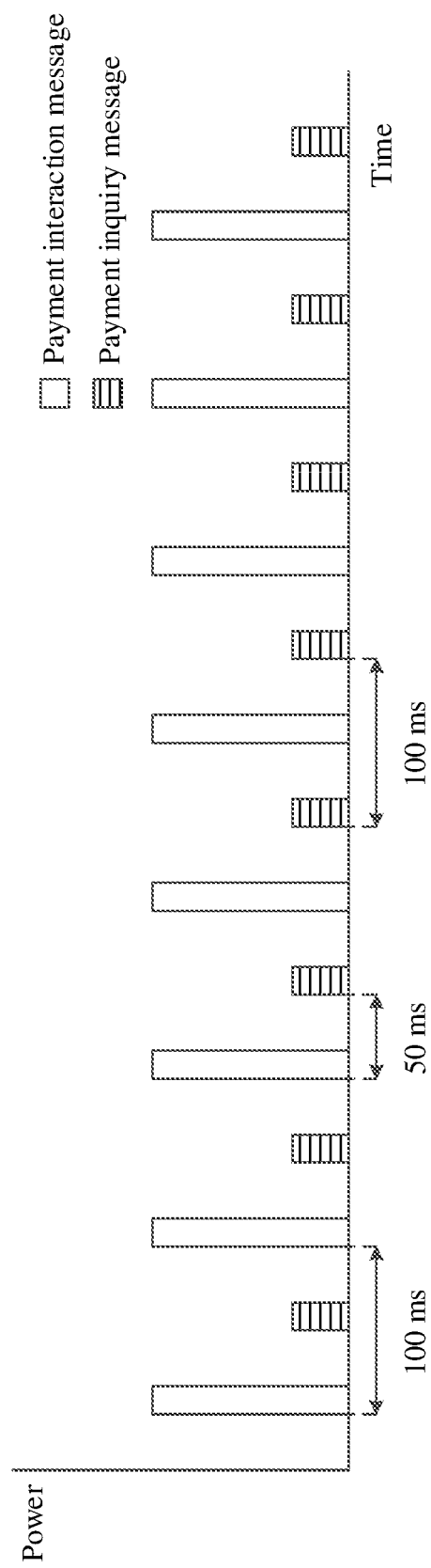
Figure 3E:
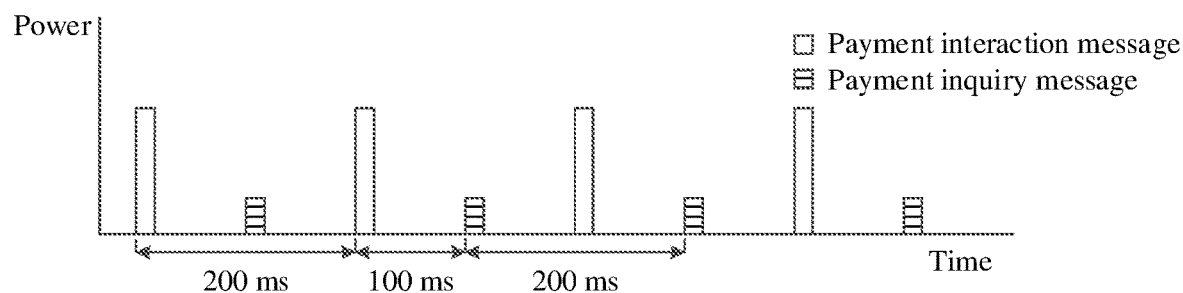
Figure 3F:
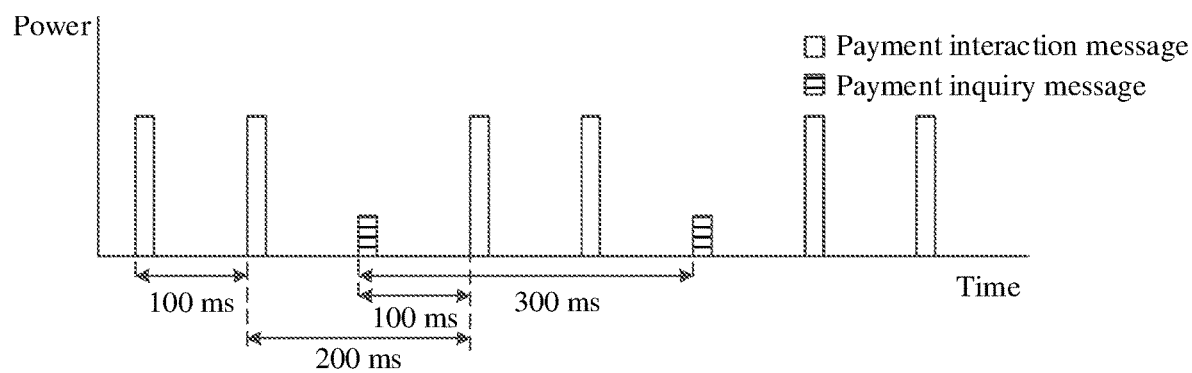
Figure 3G:
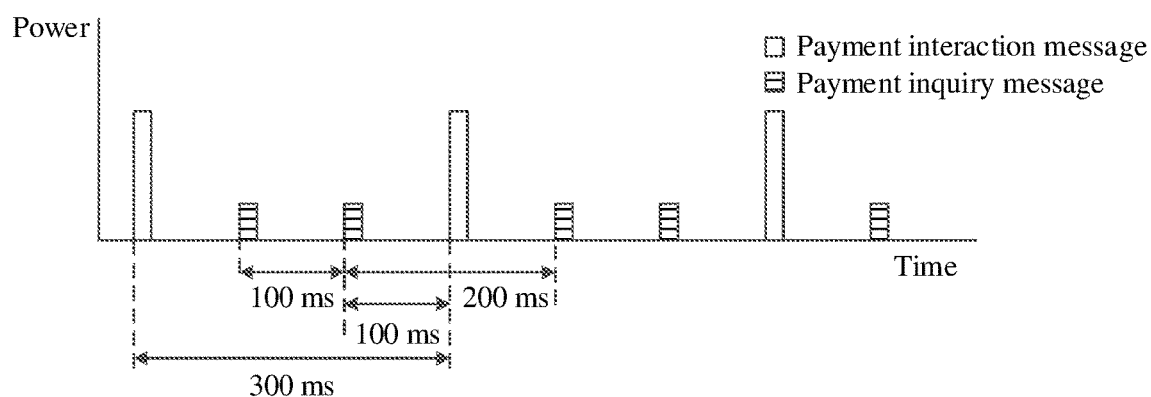

FIG. 3c to FIG. 3g each are a schematic diagram of an example of sending a payment inquiry message and a payment interaction message in time domain. As shown in FIG. 3c, a sending interval between the payment inquiry message and the payment interaction message is 1 ms, and a sending periodicity of each of the payment inquiry message and the payment interaction message is 100 ms. It can be learned that the roadside device may adjust the transmit power at an interval of 1 ms, and the sending periodicity of the payment inquiry message and the sending periodicity of the payment interaction message may be the same. As shown in FIG. 3d, a sending interval between the payment inquiry message and the payment interaction message is 50 ms, and a sending periodicity of each of the payment inquiry message and the payment interaction message is 100 ms. It can be learned that the roadside device may adjust the transmit power at an interval of 50 ms, and the sending periodicity of the payment inquiry message and the sending periodicity of the payment interaction message may be the same. As shown in FIG. 3e, a sending interval between the payment inquiry message and the payment interaction message is 50 ms, and a sending periodicity of each of the payment inquiry message and the payment interaction message is 200 ms. It can be learned that the roadside device may adjust the transmit power at an interval of 100 ms, and the sending periodicity of the payment inquiry message and the sending periodicity of the payment interaction message may be the same. As shown in FIG. 3f, a minimum sending interval between the payment interaction message and the payment inquiry message is 100 ms, a sending interval between payment interaction messages is 100 ms and 200 ms, and a sending interval between payment inquiry messages is 300 ms. It can be learned that the sending periodicity of the payment interaction message is variable. After two payment interaction messages are consecutively sent, one payment inquiry message is sent. The sending periodicity of the payment interaction message may be different from the sending periodicity of the payment inquiry message. As shown in FIG. 3g, a minimum sending interval between the payment interaction message and the payment inquiry message is 100 ms, a sending interval between payment interaction messages is 300 ms, and a sending interval between payment inquiry messages is 100 ms and 200 ms. It can be learned that the sending periodicity of the payment inquiry message is variable. After one payment interaction message is sent, two payment inquiry messages are sent. The sending periodicity of the payment interaction message may be different from the sending periodicity of the payment inquiry message.

The following describes Case 2 in detail. In a possible implementation of Case 2, the roadside unit may be the roadside system including two roadside devices. In the roadside system, one roadside device sends the payment inquiry message to the vehicle at the first power, and the other roadside device sends the payment interaction message to the vehicle at the second power. In another possible implementation of Case 2, the roadside unit may be the roadside device that is in the roadside system and that is configured to send the payment inquiry message.

Figure 4B:
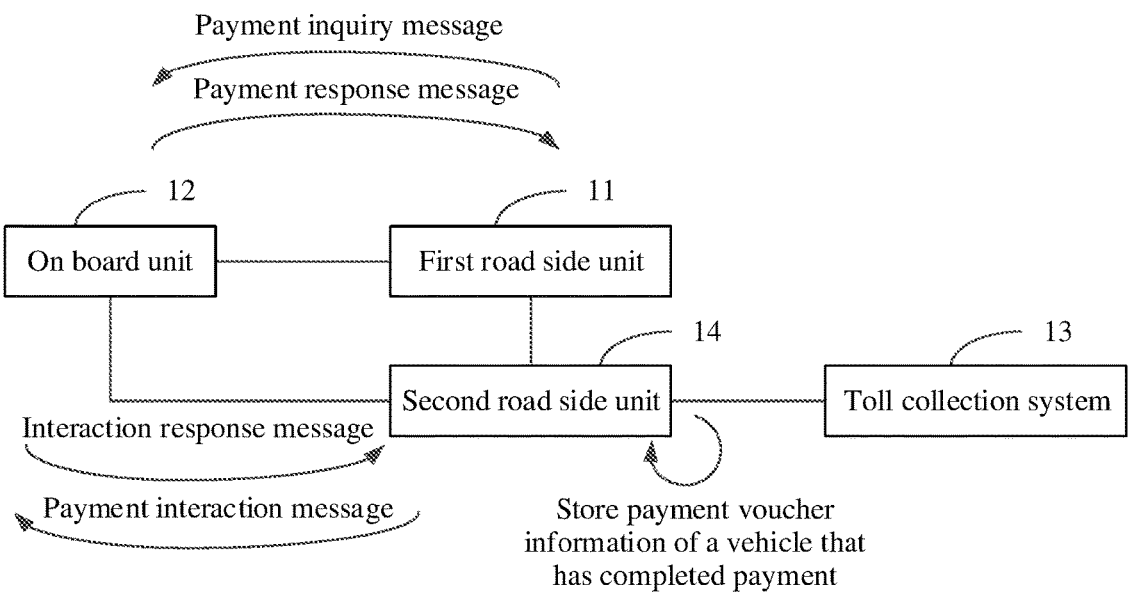
FIG. 4b is a schematic diagram of an architecture of a passing control system according to an embodiment of this application.

In an example, FIG. 4b is a schematic diagram of an architecture of a passing control system according to an embodiment of this application. As shown in FIG. 4b, the passing control system may include a first road side unit 11, an on board unit 12, a toll collection system 13, and a second road side unit 14. The first road side unit 11 and the second road side unit 14 are roadside devices, and the on board unit 12 is a device in the vehicle. The first road side unit 11 is configured to send the payment inquiry message, and the second road side unit 14 is configured to send the payment interaction message. The first road side unit 11 and the second road side unit 14 form the roadside system. The roadside unit provided in this embodiment of this application may be the roadside system including the first road side unit 11 and the second road side unit 14, or may be the first road side unit.

As shown in FIG. 4b, the second road side unit 14 may send the payment interaction message to the on board unit 12 at the second power, interact with the toll collection system 13 based on an interaction response message returned by the on board unit 12, and locally record payment voucher information of a vehicle that has completed payment. The first road side unit 11 may send the payment inquiry message to the on board unit 12 at the first power, and determine, based on a payment response message returned by the on board unit 12 and the payment voucher information recorded by the second road side unit 14, whether to control the gate to release the vehicle.

Figure 4C:
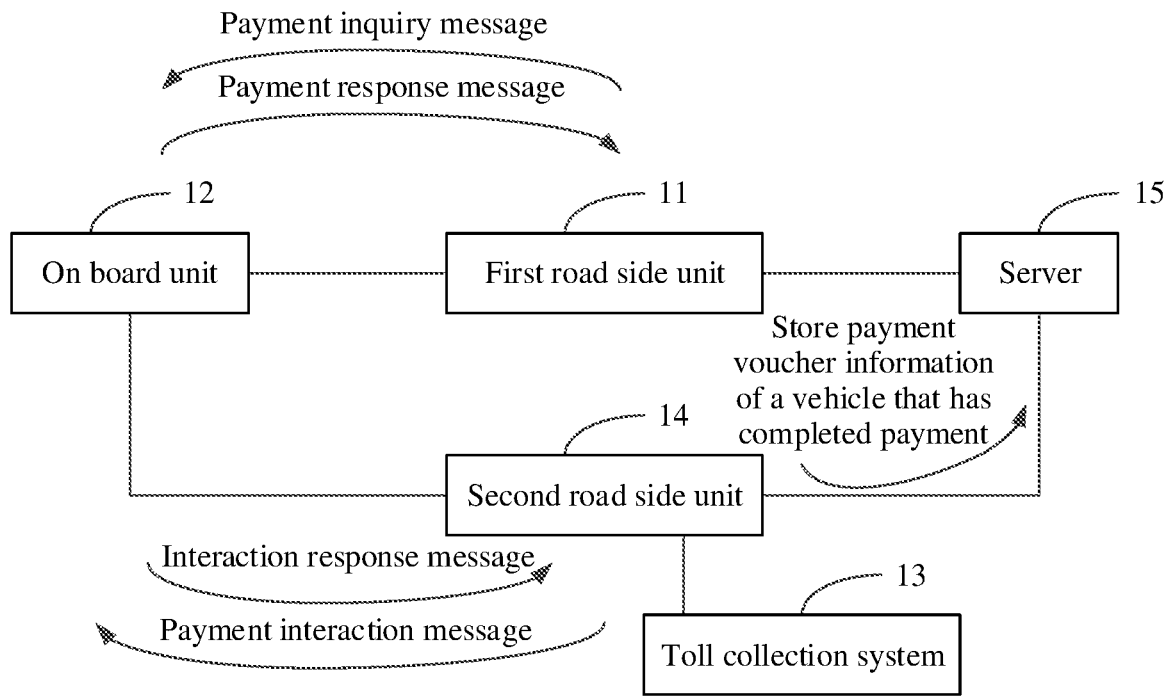
FIG. 4c is a schematic diagram of an architecture of a passing control system according to an embodiment of this application.

In another example, FIG. 4c is a schematic diagram of an architecture of a passing control system according to an embodiment of this application. As shown in FIG. 4c, the passing control system may include a first road side unit 11, an on board unit 12, a toll collection system 13, a second road side unit 14, and a server 15. The second road side unit 14 may send the payment interaction message to the on board unit 12 at the second power, interact with the toll collection system 13 based on an interaction response message returned by the on board unit 12, and record, in the server 15, payment voucher information of a vehicle that has completed payment. The first road side unit 11 may send the payment inquiry message to the on board unit 12 at the first power, and determine, based on a payment response message returned by the on board unit 12 and the payment voucher information recorded by the server 15, whether to control the gate to release the vehicle.

It should be noted that when the payment inquiry message and the payment interaction message are sent by different roadside devices, a sending channel and a sending periodicity of each of the payment inquiry message and the payment interaction message may be set according to actual situation. This is not limited in this application.

Figure 5A:
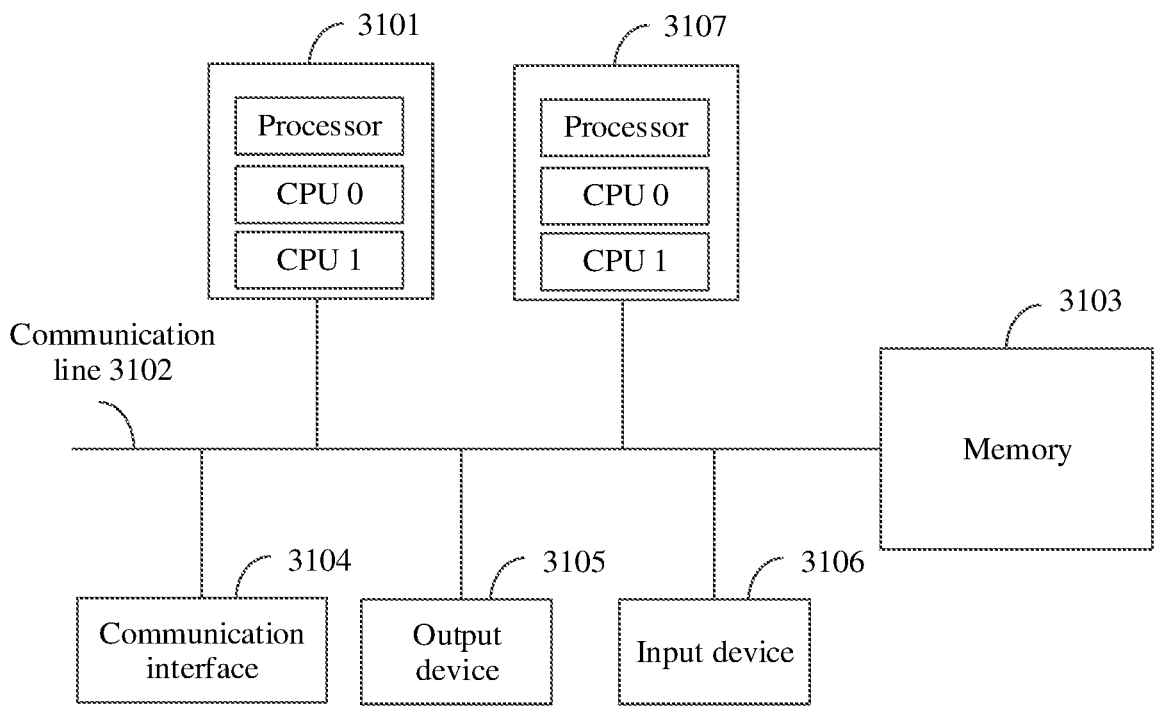
FIG. 5a is a schematic diagram of a structure of an electronic device.

FIG. 5a is a schematic diagram of a structure of an electronic device. The roadside device, the device in the vehicle, the first road side unit, the second road side unit, the on board unit, and the server in this embodiment of this application may all be implemented by the electronic device shown in FIG. 5a, for example, the first road side unit 11, the on board unit 12, the second road side unit 14, and the server 15 shown in FIG. 4c. As shown in FIG. 5a, the electronic device may include at least one processor 3101, a communication line 3102, a memory 3103, and at least one communication interface 3104.

The processor 3101 may be a general-purpose central processing unit (CPU), a microprocessor, an application-specific integrated circuit (ASIC), or one or more integrated circuits configured to control program execution of solutions in this application.

The communication line 3102 may include a path for transmitting information between the foregoing components.

The communication interface 3104 is any apparatus such as a transceiver, and is configured to communicate with another device or communication network such as the Ethernet, a RAN, or a wireless local area network (WLAN).

The memory 3103 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, the memory 3103 is not limited thereto. The memory may exist independently and is connected to the processor through the communication line 3102. The memory may alternatively be integrated with the processor. The memory provided in embodiments of this application may be usually non-volatile. The memory 3103 is configured to store computer-executable instructions for executing the solutions of this application, and the processor 3101 controls the execution. The processor 3101 is configured to execute the computer-executable instructions stored in the memory 3103, to implement the method provided in the foregoing embodiments of this application.

Optionally, the computer-executable instructions in this embodiment of this application may also be referred to as application program code. This is not specifically limited in this embodiment of this application.

In a specific implementation, in an embodiment, the processor 3101 may include one or more CPUs, for example, a CPU 0 and a CPU 1 in FIG. 5*a*.

In a specific implementation, in an embodiment, the electronic device may include a plurality of processors, such as the processor 3101 and a processor 3107 in FIG. 5*a*. Each of the processors may be a single-core (single-CPU) processor, or may be a multi-core (multi-CPU) processor. The processor herein may be one or more devices, circuits, and/or processing cores configured to process data (for example, computer program instructions).

In specific implementation, in an embodiment, the electronic device may further include an output device 3105 and an input device 3106. The output device 3105 communicates with the processor 3101, and may display information in a plurality of manners. For example, the output device 3105 may be a liquid crystal display (LCD), a light-emitting diode (LED) display device, a cathode ray tube (CRT) display device, a projector, or the like. The input device 3106 communicates with the processor 3101, and may receive an input of a user in a plurality of manners. For example, the input device 3106 may be a mouse, a keyboard, a touch-screen device, a sensing device, or the like.

Figure 5B:
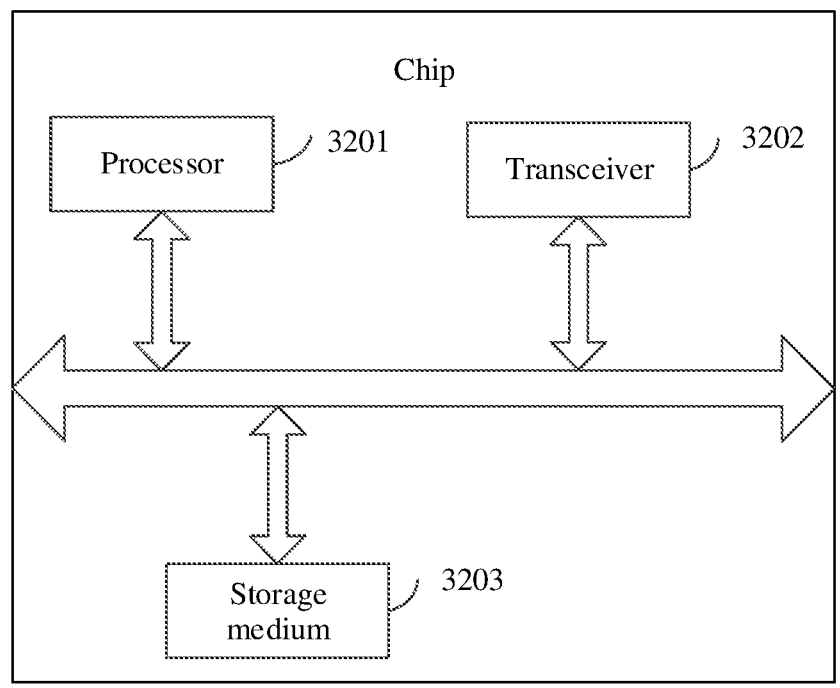
FIG. 5b is a schematic diagram of a structure of a chip according to an embodiment of this application.

FIG. 5*b* is a schematic diagram of a structure of a chip according to an embodiment of this application. As shown in FIG. 5*b*, the chip shown in FIG. 5*b* may be a general-purpose processor, or may be an application-specific processor. The chip includes a processor 3201.

Optionally, the chip further includes a transceiver 3202. The transceiver 3202 is configured to receive control of the processor 3201, and is configured to support the electronic device in performing the foregoing technical solutions.

Optionally, the chip shown in FIG. 5*b* may further include a storage medium 3203.

It should be noted that the chip shown in FIG. 5*b* may be implemented by the following circuits or components: one or more field programmable gate arrays (FPGAs), a programmable logic device (PLD), a controller, a state machine, gate logic, a discrete hardware component, any other suitable circuit, or any combination of circuits that can perform various functions described throughout this application.

Figure 6A:
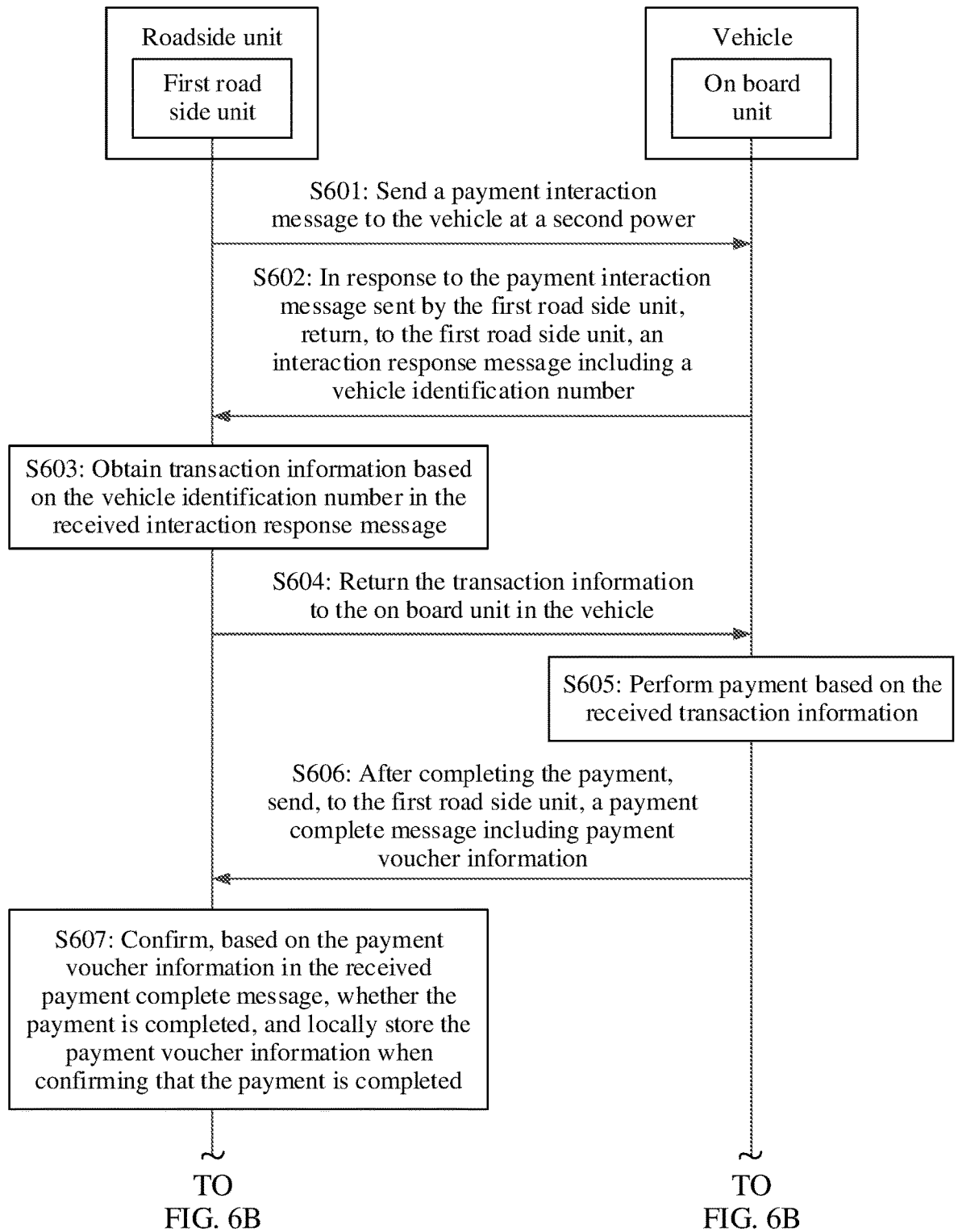
FIG. 6A and FIG. 6B are an interaction flowchart of a passing control method according to an embodiment of this application.
Figure 6B:
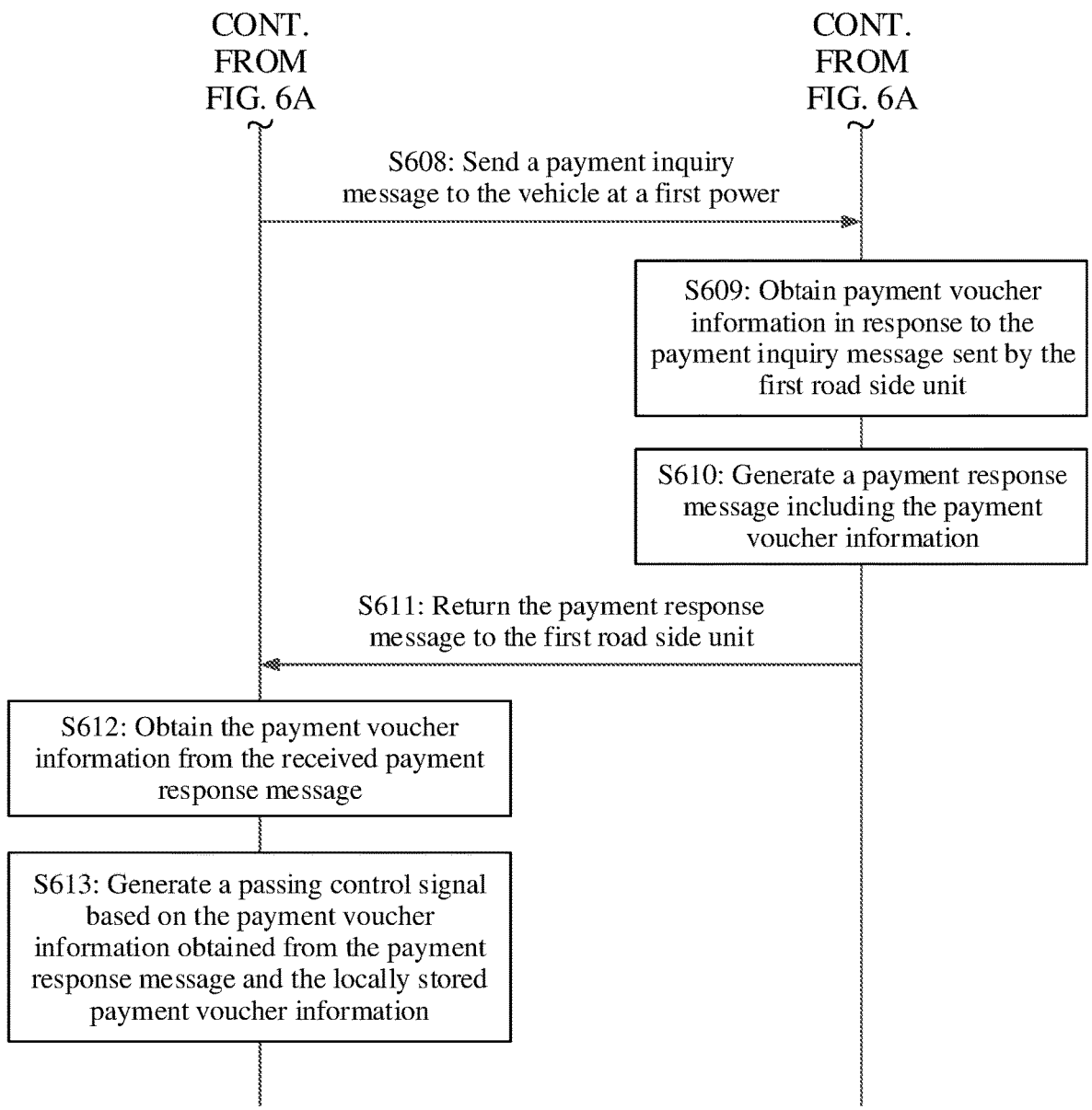

FIG. 6A and FIG. 6B are an interaction flowchart of a passing control method according to an embodiment of this application. The method may be applied to a non-free-flow tolling scenario, for example, the scenario shown in FIG. 1*a*, FIG. 1B, or FIG. 1*c*. The method may be applied to the passing control system shown in FIG. 4*a*. As shown in FIG. 6A and FIG. 6B, the method may include the following steps.

Step S601: A first road side unit of a roadside unit sends a payment interaction message to a vehicle at a second power.

The payment interaction message is used to collect a toll from the vehicle for passing through a gate.

The first road side unit may periodically send the payment interaction message. A sending periodicity of the payment interaction message may be set according to actual situation. In a possible implementation, the sending periodicity of the payment interaction message may be determined based on a road speed limit or a vehicle flow rate. When the road speed limit is low or the vehicle flow rate is small, a large sending periodicity may be set for the payment interaction message. When the road speed limit is large or the vehicle flow rate is large, a small sending periodicity may be set for the payment interaction message. When the road speed limit is low, a vehicle passing rate is small, and a vehicle passing quantity is small. In this case, a small quantity of vehicles need to perform payment. Therefore, to reduce energy consumption of the first road side unit, a large sending periodicity may be set for the payment interaction message. When the road speed limit is high, a vehicle passing rate is large (for example, on a highway), and a vehicle passing quantity is large (for example, on a main road in a city). In this case, a large quantity of vehicles need to perform payment. Therefore, to improve payment efficiency, a small sending periodicity may be set for the payment interaction message. In addition, when a communication range of the payment interaction message is large, there may be a large quantity of vehicles that need to perform payment. In this case, a small sending periodicity may be set for the payment interaction message. When a communication range of the payment interaction message is small, there may be a small quantity of vehicles that need to perform payment. In this case, a large sending periodicity may be set for the payment interaction message. The sending periodicity of the payment interaction message is variable (as shown in FIG. 3*f*).

In an implementation, the first road side unit may broadcast the payment interaction message. In this way, all vehicles in the communication range of the payment interaction message can receive the payment interaction message, and enter a payment procedure, to improve payment efficiency.

In an example, the payment interaction message may include information such as an identifier of the first road side unit.

Step S602: In response to the payment interaction message sent by the first road side unit, an on board unit in the vehicle returns, to the first road side unit, an interaction response message including a vehicle identification number.

After the vehicle enters the communication range of the payment interaction message sent by the first road side unit, the on board unit in the vehicle may receive the payment interaction message. In response to the received payment interaction message, the on board unit in the vehicle may obtain the vehicle identification number, and send the vehicle identification number to the first road side unit by using the interaction response message, so that the first road side unit enters the payment procedure of the vehicle. In an example, the vehicle identification number includes but is not limited to a vehicle identification (VID), a license plate number, or the like.

Step S603: The first road side unit of the roadside unit obtains transaction information based on the vehicle identification number in the received interaction response message.

In an implementation, after receiving the interaction response message, the first road side unit may obtain the vehicle identification number from the interaction response message, and interact with a toll collection system based on the vehicle identification number, to obtain the transaction information. In an example, the transaction information may include information such as a bill, a toll collection detail, and the vehicle identification number.

Step S604: The first road side unit of the roadside unit returns the transaction information to the on board unit in the vehicle.

After obtaining the transaction information, the first road side unit returns the transaction information to the on board unit. In a possible implementation, when returning the transaction information to the on board unit, the first road side unit may further returns at least one of a roadside device identifier (for example, a number of the first road side unit), a toll station identifier (for example, a number of a toll station), a gate identifier (for example, a number of a gate or a number of a control bar at the gate), or a random code corresponding to the first road side unit.

Step S605: The on board unit in the vehicle performs payment based on the received transaction information.

The on board unit in the vehicle may perform a deduction or accounting operation based on the received transaction information, to complete the payment.

Step S606: After completing the payment, the on board unit in the vehicle sends, to the first road side unit, a payment complete message including payment voucher information.

The payment complete message may be used to prove that the vehicle has completed the payment (including that the deduction operation, the accounting operation, or the like is performed).

Step S607: The first road side unit of the roadside unit confirms, based on the payment voucher information in the received payment complete message, whether the payment is completed, and locally stores the payment voucher information when confirming that the payment is completed.

The first road side unit performs file authenticity verification on the payment voucher information in the payment complete message. If the verification succeeds, the first road side unit may consider that the vehicle has completed payment. In this case, the first road side unit locally stores the payment voucher information for ease of subsequent inquiry.

In a possible implementation, the first road side unit may store a second toll collection voucher or a second vehicle identification number as the payment voucher information. In this embodiment of this application, a first toll collection voucher may indicate a toll collection voucher received by the first road side unit after the vehicle pays the toll (that is, a toll collection voucher in a payment response message fed back by the vehicle for a payment inquiry message, corresponding to a toll collection voucher obtained when step S612 is performed), and the second toll collection voucher may indicate a toll collection voucher stored by the first road side unit before receiving the payment response message (corresponding to before performing step S612). A first vehicle identification number may indicate a vehicle identification number received by the first road side unit after the vehicle pays the toll (that is, a vehicle identification number in the payment response message fed back by the vehicle for the payment inquiry message, corresponding to a vehicle identification number obtained when step S612 is performed), and the second vehicle identification number may indicate a vehicle identification number stored by the first road side unit before receiving the payment response message (corresponding to before performing step S612).

In an example, a vehicle identification number (the first vehicle identification number or the second vehicle identification number) includes but is not limited to the VID or the license plate number. The toll collection voucher (the first toll collection voucher or the second toll collection voucher) may include a vehicle identification number, and at least one of the roadside device identifier, the toll station identifier, and the gate identifier.

Step S608: The first road side unit of the roadside unit sends the payment inquiry message to the vehicle at a first power.

The payment inquiry message is used to request payment voucher information of a vehicle that has completed payment but has not passed through the gate. In an example, the payment voucher information may be the toll collection voucher or the vehicle identification number.

The first road side unit may periodically send the payment inquiry message. A sending periodicity of the payment inquiry message may be set according to actual situation. In a possible implementation, the sending periodicity of the payment inquiry message may be determined based on a road speed limit or a vehicle flow rate. When the road speed limit is high (for example, on a highway) or the vehicle flow rate is large (for example, on a main road in a city), a small sending periodicity may be set for the payment inquiry message. When the road speed limit is low or the vehicle flow rate is small, a large sending periodicity may be set for the payment inquiry message. The sending periodicity of the payment inquiry message is variable (as shown in FIG. 3g).

It should be noted that the payment inquiry message in this step is periodically sent, and there is no sequence relationship between the payment inquiry message in this step and the payment interaction message in step S601. The on board unit in the vehicle can receive the payment inquiry message and perform subsequent step S609 and the like only when the vehicle is close to the gate. A sending interval between the payment inquiry message in this step and the payment interaction message in step S601 may be set according to actual situation, and a minimum adjustment interval may be 1 ms. This is not limited in this application.

In an implementation, the first road side unit may broadcast the payment inquiry message. Because a communication range of the payment inquiry message is small, although the first road side unit broadcasts the payment inquiry message, there is only one vehicle that receives the payment inquiry message. In other words, only one vehicle can enter an inquiry procedure, and this helps accurately control vehicle passing.

In a possible implementation, the payment inquiry message may include at least one of the roadside device identifier, the toll station identifier, the gate identifier, or the random code. The random code is used to identify a fake payment response message sent by the on board unit.

Step S609: The on board unit in the vehicle obtains the payment voucher information in response to the payment inquiry message sent by the first road side unit.

After the vehicle enters the communication range of the payment inquiry message sent by the first road side unit, the on board unit in the vehicle may receive the payment inquiry message. In response to the received payment inquiry message, the on board unit in the vehicle may obtain the payment voucher information, and send the payment voucher information to the first road side unit by using the payment response message.

Step S610: The on board unit in the vehicle generates the payment response message including the payment voucher information.

Step S611: The on board unit in the vehicle returns the payment response message to the first road side unit.

In a possible implementation, when the received payment inquiry message includes the random code, the returned payment response message includes the same random code, to improve reliability.

Step S612: The first road side unit of the roadside unit obtains the payment voucher information from the received payment response message.

In a possible implementation, the payment voucher information obtained by the first road side unit from the payment response message includes the vehicle identification number or the toll collection voucher. To distinguish the vehicle identification number (that is, the second vehicle identification number) or the toll collection voucher (that is, the second toll collection voucher) that is stored by the first road side unit before a current moment, in this embodiment of this application, the vehicle identification number obtained by the first road side unit from the payment response message is denoted as the first vehicle identification number, and the toll collection voucher obtained by the first road side unit from the payment response message is denoted as the first toll collection voucher.

Step S613: The first road side unit of the roadside unit generates a passing control signal based on the payment voucher information obtained from the payment response message and the locally stored payment voucher information.

The passing control signal is used to control the gate to release the vehicle. The payment voucher information obtained from the payment response message includes the first toll collection voucher or the first vehicle identification number.

In a possible implementation, the payment voucher information obtained by the first road side unit from the payment response message is the first toll collection voucher, and the payment voucher information locally stored by the first road side unit is the second toll collection voucher. Step S612 may include: Generate the passing control signal based on a determining result indicating that the first toll collection voucher is consistent with the second toll collection voucher.

When the first toll collection voucher is consistent with the second toll collection voucher, it indicates that a vehicle that is waiting to pass through the gate has completed the payment. Therefore, the passing control signal may be generated, to control the gate to release the vehicle. When the first toll collection voucher is inconsistent with the second toll collection voucher, it indicates that the vehicle that is waiting to pass through the gate does not pay the toll or a payment status is not confirmed. In this case, no control signal is generated to control the gate to release the vehicle.

In a possible implementation, payment voucher information obtained by a second road side unit from the payment response message is the first vehicle identification number, and payment voucher information locally stored by the second road side unit is the second vehicle identification number. Step S612 may include: Generate the passing control signal based on a determining result indicating that the first vehicle identification number is consistent with the second vehicle identification number.

When the first vehicle identification number is consistent with the second vehicle identification number, it indicates that a vehicle that is waiting to pass through the gate has completed the payment. Therefore, the passing control signal may be generated, to control the gate to release the vehicle. When the first vehicle identification number is inconsistent with the second vehicle identification number, it indicates that the vehicle that is waiting to pass through the gate does not pay the toll or a payment status is not confirmed. In this case, no control signal is generated to control the gate to release the vehicle.

In an implementation, the first road side unit may send the passing control signal to the control bar at the gate, to enable the control bar to perform a bar lifting operation, so that the gate releases the vehicle.

In a possible implementation, in step S611, the on board unit may repeatedly send the payment response message for a plurality of times, to improve reliability. After the first road side unit of the roadside unit generates the passing control signal, the first road side unit may further send a release confirmation message to the vehicle. After receiving the release confirmation message from the roadside unit, the on board unit in the vehicle may stop sending the payment response message based on the release confirmation message.

In this embodiment of this application, the payment procedure is completed based on the payment interaction message with a high power, so that the vehicle can complete the payment at a location far away from the gate. A payment completion time point is greatly advanced compared with a time point at which the vehicle arrives at the gate. Release confirmation is performed by using the payment inquiry message with a low power, so that when the vehicle that pays the toll further moves to a location near the gate, the roadside unit can confirm that the vehicle has paid the toll, to enable the gate to release the vehicle that has paid the toll, and avoid releasing another vehicle that has not paid the toll or a vehicle of which payment status is not confirmed. This ensures vehicle passing efficiency, improves accuracy of releasing the vehicle, and implements reliable and efficient non-free-flow payment based on a V2X technology.

Figure 7A:
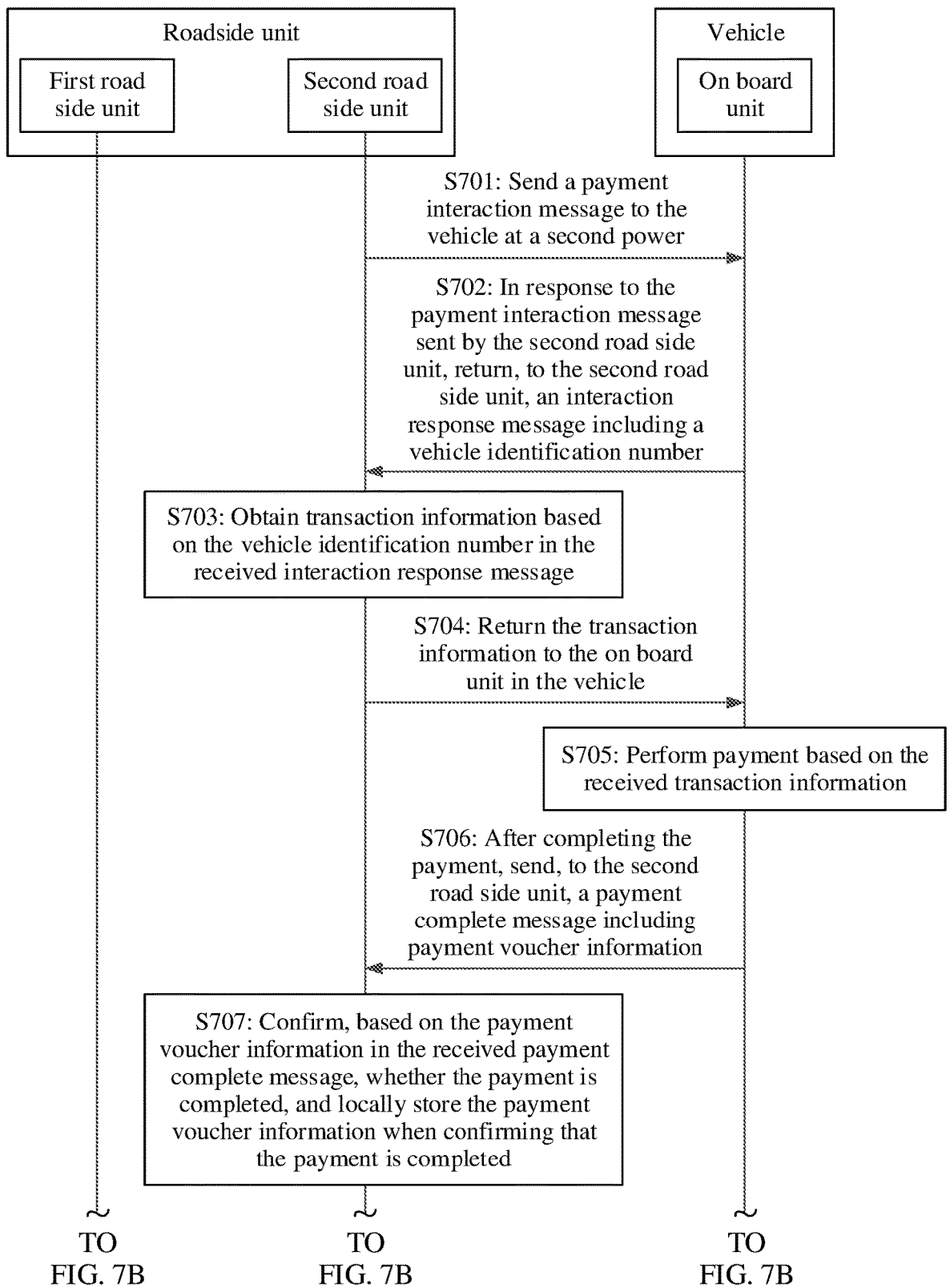
FIG. 7A and FIG. 7B are an interaction flowchart of a passing control method according to an embodiment of this application.
Figure 7B:
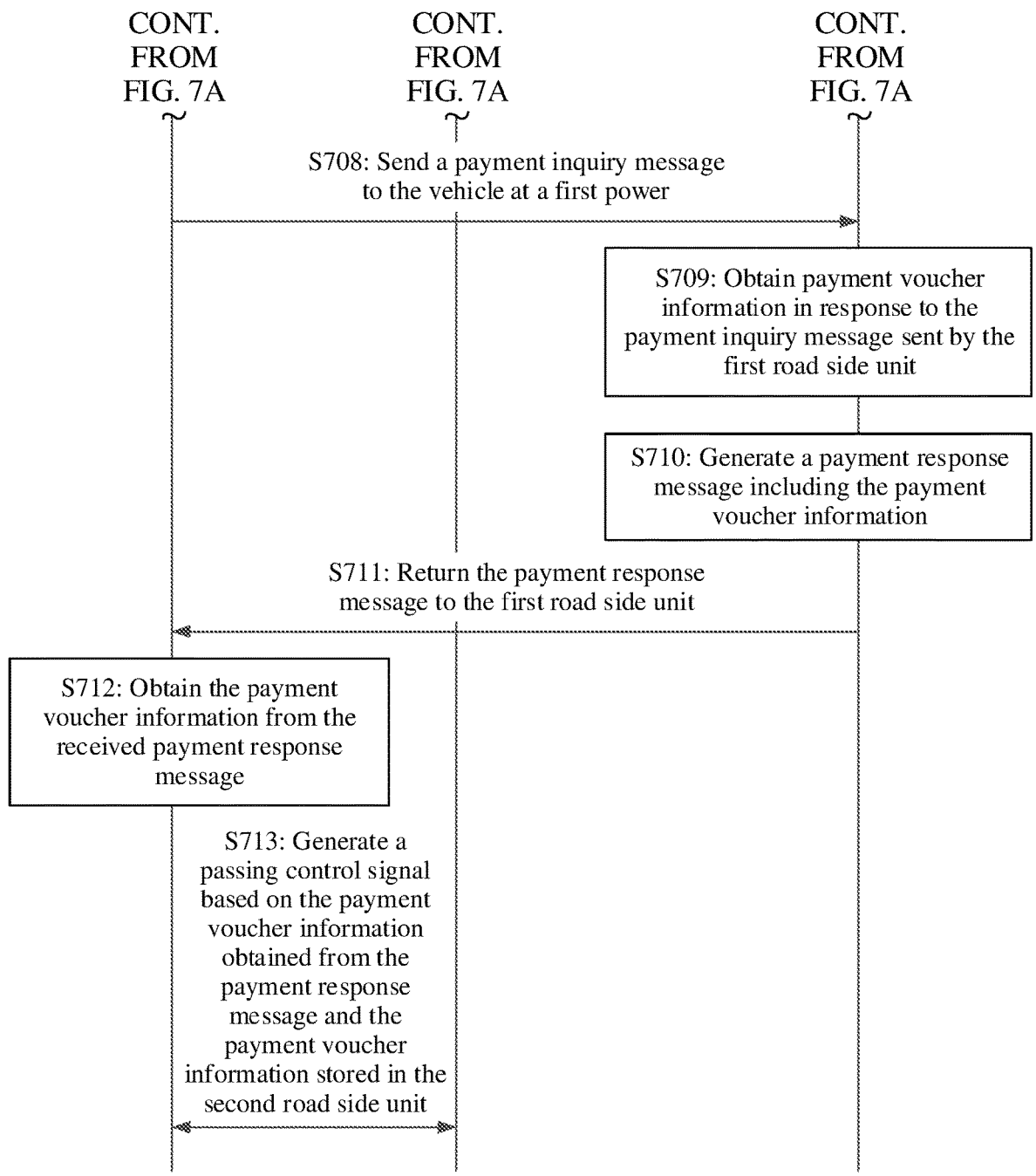

FIG. 7A and FIG. 7B are an interaction flowchart of a passing control method according to an embodiment of this application. The method may be applied to a non-free-flow payment scenario, for example, the scenario shown in FIG. 1a, FIG. 1B, or FIG. 1c. The method may be applied to the passing control system shown in FIG. 4b. As shown in FIG. 7A and FIG. 7B, the method may include the following steps.

Step S701: A second road side unit of a roadside unit sends a payment interaction message to a vehicle at a second power.

Step S702: In response to the payment interaction message sent by the second road side unit, an on board unit in the vehicle returns, to the second road side unit, an interaction response message including a vehicle identification number.

Step S703: The second road side unit of the roadside unit obtains transaction information based on the vehicle identification number in the received interaction response message.

Step S704: The second road side unit of the roadside unit returns the transaction information to the on board unit in the vehicle.

Step S705: The on board unit in the vehicle performs payment based on the received transaction information.

Step S706: After completing the payment, the on board unit in the vehicle sends, to the second road side unit, a payment complete message including payment voucher information.

Step S707: The second road side unit of the roadside unit confirms, based on the payment voucher information in the received payment complete message, whether the payment is completed, and locally stores the payment voucher information when confirming that the payment is completed.

For step S701 to step S707, refer to step S601 to step S607. Details are not described herein again.

Step S708: A first road side unit of the roadside unit sends a payment inquiry message to the vehicle at a first power.

Step S709: The on board unit in the vehicle obtains payment voucher information in response to the payment inquiry message sent by the first road side unit.

Step S710: The on board unit in the vehicle generates a payment response message including the payment voucher information.

Step S711: The on board unit in the vehicle returns the payment response message to the first road side unit.

For step S708 to step S711, refer to step S608 to step S611. Details are not described herein again.

Step S712: The first road side unit of the roadside unit obtains the payment voucher information from the received payment response message.

Step S713: The first road side unit of the roadside unit generates a passing control signal based on the payment voucher information obtained from the payment response message and the payment voucher information stored in the second road side unit.

In a possible implementation, the payment voucher information obtained by the first road side unit from the payment response message is a first toll collection voucher, and the payment voucher information locally stored in the second road side unit is a second toll collection voucher. The first road side unit may send a search request to the second road side unit, and the search request may include the first toll collection voucher. After receiving the search request, the second road side unit searches for a second toll collection voucher consistent with the first toll collection voucher. If the consistent second toll collection voucher is found, the second road side unit sends a found notification to the first road side unit; otherwise, the second road side unit sends an unfound notification to the first road side unit. After receiving the found notification sent by the second road side unit, the first road side unit may determine that the first toll collection voucher is consistent with the second toll collection voucher, and then may generate the passing control signal.

In a possible implementation, the payment voucher information obtained by the first road side unit from the payment response message is a first vehicle identification number, and the payment voucher information locally stored in the second road side unit is a second vehicle identification number. The first road side unit may send a search request to the second road side unit, and the search request may include the first vehicle identification number. After receiving the search request, the second road side unit searches for a second vehicle identification number consistent with the first vehicle identification number. If the consistent second vehicle identification number is found, the second road side unit sends a found notification to the first road side unit; otherwise, the second road side unit sends an unfound notification to the first road side unit. After receiving the found notification sent by the second road side unit, the first road side unit may determine that the first vehicle identification number is consistent with the second vehicle identification number, and then may generate the passing control signal.

In an implementation, the first road side unit may send the passing control signal to a control bar at a gate, to enable the control bar to perform a bar lifting operation, so that the gate releases the vehicle.

In a possible implementation, in step S611, the on board unit may repeatedly send the payment response message for a plurality of times, to improve reliability. After the first road side unit of the roadside unit generates the passing control signal, the first road side unit may further send a release confirmation message to the vehicle. After receiving the release confirmation message from the roadside unit, the on board unit in the vehicle may stop sending the payment response message based on the release confirmation message.

In this embodiment of this application, a payment procedure is completed based on the payment interaction message with a high power, so that the vehicle can complete the payment at a location far away from the gate. A payment completion time point is greatly advanced compared with a time point at which the vehicle arrives at the gate. Release confirmation is performed by using the payment inquiry message with a low power, so that when the vehicle that has paid a toll further moves to a location near the gate, the roadside unit can confirm that the vehicle has paid the toll, to enable the gate to release the vehicle that has paid the toll, and avoid releasing another vehicle that has not paid the toll or a vehicle of which payment status is not confirmed. This ensures vehicle passing efficiency, improves accuracy of releasing the vehicle, and implements reliable and efficient non-free-flow payment based on a V2X technology.

Figure 8A:
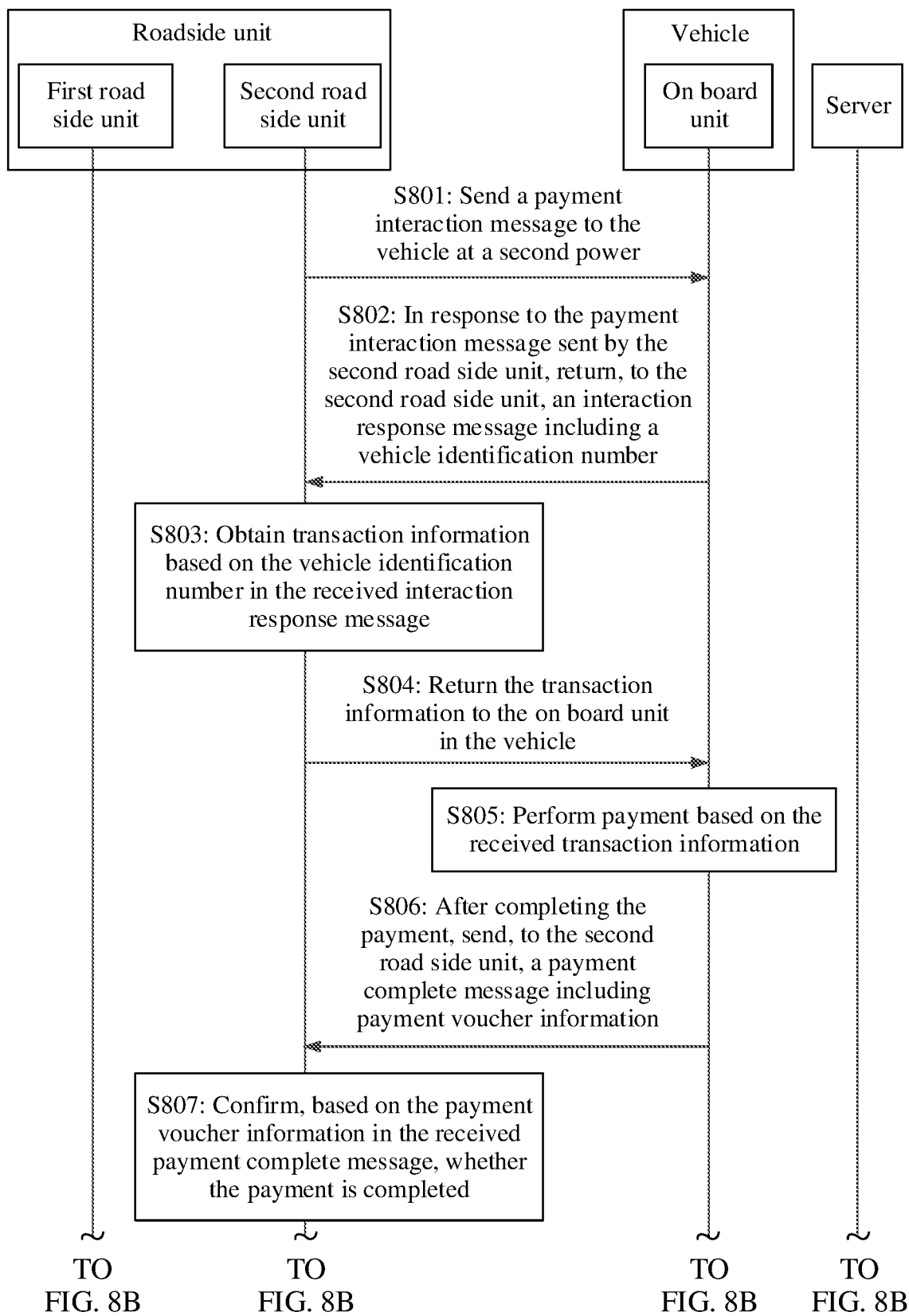
FIG. 8A and FIG. 8B are an interaction flowchart of a passing control method according to an embodiment of this application.
Figure 8B:
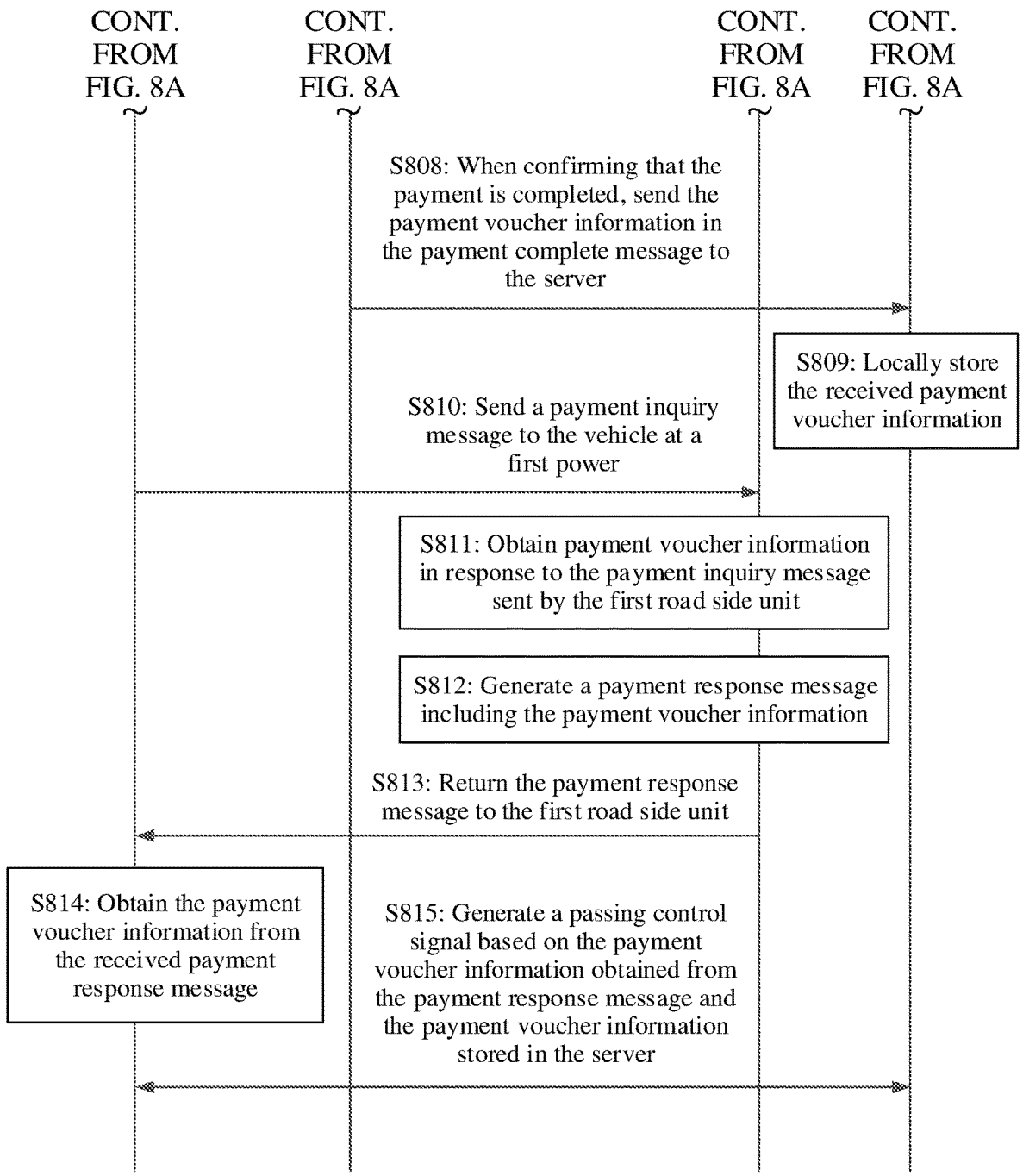

FIG. 8A and FIG. 8B are an interaction flowchart of a passing control method according to an embodiment of this application. The method may be applied to a non-free-flow payment scenario, for example, the scenario shown in FIG. 1a, FIG. 1B, or FIG. 1c. The method may be applied to the passing control system shown in FIG. 4c. As shown in FIG. 8A and FIG. 8B, the method may include the following steps:

Step S801: A second road side unit of a roadside unit sends a payment interaction message to a vehicle at a second power.

Step S802: In response to the payment interaction message sent by the second road side unit, an on board unit in the vehicle returns, to the second road side unit, an interaction response message including a vehicle identification number.

Step S803: The second road side unit of the roadside unit obtains transaction information based on the vehicle identification number in the received interaction response message.

Step S804: The second road side unit of the roadside unit returns the transaction information to the on board unit in the vehicle.

Step S805: The on board unit in the vehicle performs payment based on the received transaction information.

Step S806: After completing the payment, the on board unit in the vehicle sends, to the second road side unit, a payment complete message including payment voucher information.

Step S807: The second road side unit of the roadside unit confirms, based on the payment voucher information in the received payment complete message, whether the payment is completed.

For step S801 to step S807, refer to step S601 to step S607. Details are not described herein again.

Step S808: When confirming that the payment is completed, the second road side unit of the roadside unit sends the payment voucher information in the payment complete message to a server.

Step S809: The server locally stores the received payment voucher information.

Step S810: A first road side unit of the roadside unit sends a payment inquiry message to the vehicle at a first power.

Step S811: The on board unit in the vehicle obtains payment voucher information in response to the payment inquiry message sent by the first road side unit.

Step S812: The on board unit in the vehicle generates a payment response message including the payment voucher information.

Step S813: The on board unit in the vehicle returns the payment response message to the first road side unit.

For step S810 to step S813 to step S608 to step S611.

Step S814: The first road side unit of the roadside unit obtains the payment voucher information from the received payment response message.

Step S815: The first road side unit of the roadside unit generates a passing control signal based on the payment voucher information obtained from the payment response message and the payment voucher information stored in the server.

In a possible implementation, the payment voucher information obtained by the first road side unit from the payment response message is a first toll collection voucher, and the payment voucher information locally stored in the server is a second toll collection voucher. The first road side unit may send a search request to the server, and the search request may include the first toll collection voucher. After receiving the search request, the server searches for a second toll collection voucher consistent with the first toll collection voucher. If the consistent second toll collection voucher is found, the server sends a found notification to the first road side unit; otherwise, the server sends an unfound notification to the first road side unit. After receiving the found notification sent by the server, the first road side unit may determine that the first toll collection voucher is consistent with the second toll collection voucher, and then may generate the passing control signal.

In a possible implementation, the payment voucher information obtained by the first road side unit from the payment response message is a first vehicle identification number, and the payment voucher information locally stored in the server is a second vehicle identification number. The first road side unit may send a search request to the server, and the search request may include the first vehicle identification number. After receiving the search request, the server searches for a second vehicle identification number consistent with the first vehicle identification number. If the consistent second vehicle identification number is found, the server sends a found notification to the first road side unit; otherwise, the server sends an unfound notification to the first road side unit. After receiving the found notification sent by the server, the first road side unit may determine that the first vehicle identification number is consistent with the second vehicle identification number, and then may generate the passing control signal.

In an implementation, the first road side unit may send the passing control signal to a control bar at a gate, to enable the control bar to perform a bar lifting operation, so that the gate releases the vehicle.

In a possible implementation, in step S611, the on board unit may repeatedly send the payment response message for a plurality of times, to improve reliability. After the first road side unit of the roadside unit generates the passing control signal, the first road side unit may further send a release confirmation message to the vehicle. After receiving the release confirmation message from the roadside unit, the on board unit in the vehicle may stop sending the payment response message based on the release confirmation message.

In this embodiment of this application, a payment procedure is completed based on the payment interaction message with a high power, so that the vehicle can complete the payment at a location far away from the gate. A payment completion time point is greatly advanced compared with a time point at which the vehicle arrives at the gate. Release confirmation is performed by using the payment inquiry message with a low power, so that when the vehicle that has paid a toll further moves to a location near the gate, the roadside unit can confirm that the vehicle has paid the toll, to enable the gate to release the vehicle that has paid the toll, and avoid releasing another vehicle that has not paid the toll or a vehicle of which payment status is not confirmed. This ensures vehicle passing efficiency, improves accuracy of releasing the vehicle, and implements reliable and efficient non-free-flow payment based on a V2X technology.

Figure 9:
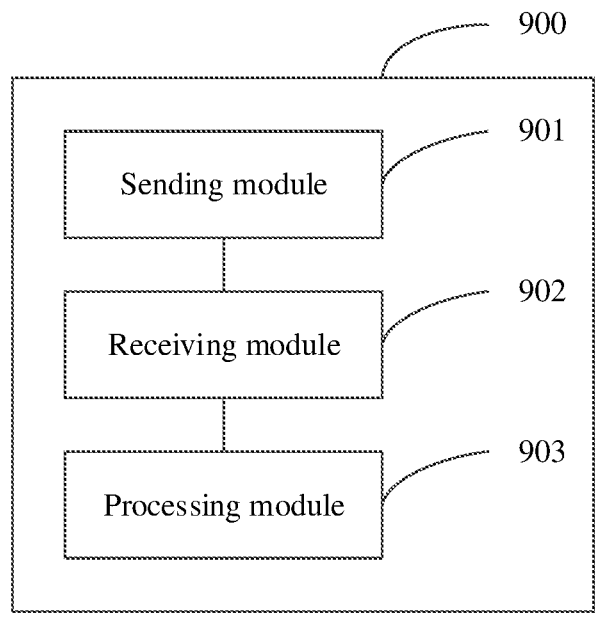
FIG. 9 is a schematic diagram of a structure of a passing control apparatus according to an embodiment of this application.

FIG. 9 is a schematic diagram of a structure of a passing control apparatus according to an embodiment of this application. The apparatus may be applied to a roadside device of a roadside unit, for example, the first road side unit 11 shown in FIG. 4*a*, FIG. 4*b*, and FIG. 4*c*. As shown in FIG. 9, this apparatus 900 includes:

a sending module 901, configured to send a payment inquiry message to a vehicle at a first power, where the payment inquiry message is used to request payment voucher information of a vehicle that has completed payment but has not passed through a gate, the payment is to pay a toll used to pass through the gate, the first power is less than a second power at which a payment interaction message is sent, and the payment interaction message is used to collect the toll from the vehicle;

a receiving module 902, configured to receive a payment response message fed back by the vehicle for the payment inquiry message sent by the sending module 901, where the payment response message includes the payment voucher information; and a processing module 903, configured to generate a passing control signal based on the payment response message received by the receiving module 902, where the passing control signal is used to control the gate to release the vehicle.

In a possible implementation, the payment voucher information is a first toll collection voucher received after the vehicle pays the toll; the apparatus further includes a storage module, configured to store a second toll collection voucher; and the processing module is further configured to generate the passing control signal based on a determining result indicating that the first toll collection voucher is consistent with the second toll collection voucher.

In a possible implementation, the payment voucher information is a first vehicle identification number; the apparatus further includes a storage module, configured to store a second vehicle identification number; and the processing module is further configured to generate the passing control signal based on a determining result indicating that the first vehicle identification number is consistent with the second vehicle identification number.

In a possible implementation, the payment inquiry message includes at least one of a roadside device identifier, a toll station identifier, a gate identifier, or a random code.

In a possible implementation, the payment inquiry message includes a random code, and the payment response message includes the random code.

In a possible implementation, the sending module is further configured to send a release confirmation message to the vehicle.

In a possible implementation, the payment inquiry message is a broadcast message that is periodically sent.

In a possible implementation, a sending periodicity of the payment inquiry message is determined based on a road speed limit or a vehicle flow rate.

In a possible implementation, the sending module is further configured to send the payment interaction message to the vehicle at the second power, where the payment interaction message and the payment inquiry message are sent through frequency division or time division.

In a possible implementation, the roadside unit includes:
- a road side unit, configured to send the payment inquiry message and send the payment interaction message;
or
- a roadside system including a first road side unit configured to send the payment inquiry message, and a second road side unit configured to send the payment interaction message;
or
- a first road side unit that is in the roadside system and that is configured to send the payment inquiry message.

In this embodiment of this application, a payment procedure is completed based on the payment interaction message with a high power, so that the vehicle can complete the payment at a location far away from the gate. A payment completion time point is greatly advanced compared with a time point at which the vehicle arrives at the gate. Release confirmation is performed by using the payment inquiry message with a low power, so that when the vehicle that has paid a toll further moves to a location near the gate, the roadside unit can confirm that the vehicle has paid the toll, to enable the gate to release the vehicle that has paid the toll, and avoid releasing another vehicle that has not paid the toll or a vehicle of which payment status is not confirmed. This ensures vehicle passing efficiency, improves accuracy of releasing the vehicle, and implements reliable and efficient non-free-flow payment based on a V2X technology.

Figure 10:
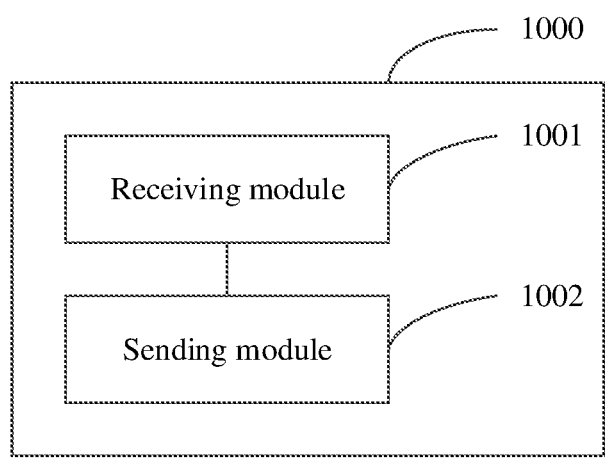
FIG. 10 is a schematic diagram of a structure of a passing control apparatus according to an embodiment of this application.

FIG. 10 is a schematic diagram of a structure of a passing control apparatus according to an embodiment of this application. The apparatus may be applied to a device in a vehicle, for example, the on board unit 12 shown in FIG. 4a, FIG. 4b, and FIG. 4c. As shown in FIG. 10, this apparatus 1000 includes:
- a receiving module 1001, configured to receive a payment inquiry message from a roadside unit, where the payment inquiry message is used to request payment voucher information of a vehicle that has completed payment but has not passed through a gate, and the payment is to pay a toll used to pass through the gate; and a sending module 1002, configured to send a payment response message to the roadside unit based on the payment inquiry message received by the receiving module 1001, where the payment response message includes the payment voucher information.

In a possible implementation, the receiving module is further configured to receive a toll collection voucher after the vehicle pays the toll, where the payment voucher information is the toll collection voucher.

In a possible implementation, the payment voucher information is a vehicle identification number of the vehicle, and the sending module is further configured to send the vehicle identification number to the roadside unit after the vehicle pays the toll.

In a possible implementation, the payment inquiry message includes at least one of a roadside device identifier, a toll station identifier, a gate identifier, or a random code.

In a possible implementation, the payment inquiry message includes a random code, and the payment response message includes the random code.

In a possible implementation, the sending a payment response message is repeatedly sending the payment response message for a plurality of times, the receiving module is further configured to receive a release confirmation message from the roadside unit, and the sending module is further configured to stop sending the payment response message based on the release confirmation message.

In this embodiment of this application, an inquiry procedure is completed in response to the payment inquiry message with a low power, so that a vehicle that has completed the payment can smoothly pass through the gate when moving to a location close to the gate, and a vehicle that has not completed the payment cannot pass through the gate when moving to the location close to the gate. This ensures vehicle passing efficiency, and improves accuracy of releasing the vehicle, and implements reliable and efficient non-free-flow payment based on a V2X technology.

An embodiment of this application provides a passing control apparatus. The apparatus includes a processor, and a memory configured to store instructions that can be executed by the processor. When the processor is configured to execute the instructions, the method is implemented.

An embodiment of this application provides a chip. The chip includes a processor, and a memory configured to store instructions that can be executed by the processor. When the processor is configured to execute the instructions, the method is implemented.

An embodiment of this application provides a computer-readable storage medium. The computer-readable storage medium stores computer program instructions. When the computer program instructions are executed by a processor, the method is implemented.

An embodiment of this application provides a computer program product. The computer program product includes computer-readable code. When the computer-readable code is run in a passing control apparatus, the passing control apparatus is enabled to perform the method.

The computer-readable storage medium may be a tangible device that may retain and store instructions for use by an instruction execution device. The computer-readable storage medium may be, for example, (but is not limited to) an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a random access memory (RAM), a read-only memory (ROM), an erasable programmable read-only memory (EPROM, or flash memory), a static random access memory (SRAM), a portable compact disc read-only memory (CD-ROM), a digital versatile disc (DVD), a memory stick, a floppy disk, a mechanical coding device, for example, a punching card or a groove protrusion structure that stores instructions, and any suitable combination thereof.

The computer-readable program instructions or code described herein may be downloaded from a computer-readable storage medium to each computing/processing device, or downloaded to an external computer or an external storage device over a network, such as the Internet, a local area network, a wide area network, and/or a wireless network. The network may include copper transmission cables, optical fiber transmission, wireless transmission, routers, firewalls, switches, gateway computers, and/or edge servers. A network adapter card or a network interface in each computing/processing device receives computer-readable program instructions from a network, and forwards the computer-readable program instructions for storage in a computer-readable storage medium in each computing/processing device.

The computer program instructions used to perform operations in this application may be assembly instructions, instruction set architecture (ISA) instructions, machine instructions, machine-related instructions, microcode, firmware instructions, status setting data, or source code or target code written in one or any combination of more programming languages. The programming languages include object-oriented programming languages such as Smalltalk and C++, and a conventional procedural programming language such as "C" or a similar programming language. The computer-readable program instructions may be executed entirely on a user computer, partly on the user computer, as a stand-alone software package, partly on the user computer and partly on a remote computer, or entirely on the remote computer or a server. When a remote computer is involved, the remote computer may be connected to a user computer over any type of network, including a local area network (LAN) or a wide area network (WAN), or may be connected to an external computer (for example, connected by using an Internet service provider over the Internet). In some embodiments, an electronic circuit, for example, a programmable logic circuit, a field programmable gate array (FPGA), or a programmable logic array (PLA), is customized by using status information of computer-readable program instructions. The electronic circuit may execute the computer-readable program instructions, to implement various aspects of this application.

The various aspects of this application are described herein with reference to the flowcharts and/or the block diagrams of the method, the apparatus (system), and the computer program product according to embodiments of this application. It should be understood that each block in the flowcharts and/or the block diagrams and combinations of blocks in the flowcharts and/or the block diagrams may be implemented by computer-readable program instructions.

These computer-readable program instructions may be provided to a processor of a general-purpose computer, a special-purpose computer, or another programmable data processing apparatus to produce a machine, so that the instructions, when executed by the processor of the computer or the another programmable data processing apparatus, create an apparatus for implementing functions/actions specified in one or more blocks in the flowcharts and/or the block diagrams. Alternatively, these computer-readable program instructions may be stored in a computer-readable storage medium. These instructions enable a computer, a programmable data processing apparatus, and/or another device to work in a specific manner. Therefore, the computer-readable medium storing the instructions includes an artifact that includes instructions for implementing various aspects of functions/actions specified in one or more blocks in the flowcharts and/or the block diagrams.

Alternatively, these computer-readable program instructions may be loaded onto a computer, another programmable data processing apparatus, or another device, so that a series of operation steps are performed on the computer, the another programmable data processing apparatus, or the another device to produce a computer-implemented process. Therefore, the instructions executed on the computer, the another programmable data processing apparatus, or the another device implements functions/actions specified in one or more blocks in the flowcharts and/or the block diagrams.

The flowcharts and the block diagrams in the accompanying drawings illustrate system architectures, functions, and operations of possible implementations of apparatuses, systems, methods, and computer program products according to a plurality of embodiments of this application. In this regard, each block in the flowcharts or the block diagrams may represent a module, a program segment, or a part of the instructions, where the module, the program segment, or the part of the instructions includes one or more executable instructions for implementing a specified logical function. In some alternative implementations, the functions marked in the blocks may also occur in a sequence different from that marked in the accompanying drawings. For example, two consecutive blocks may actually be executed substantially in parallel, and sometimes may be executed in a reverse order, depending on a function involved.

It should also be noted that each block in the block diagrams and/or the flowcharts and a combination of blocks in the block diagrams and/or the flowcharts may be implemented by hardware (for example, a circuit or an ASIC (Application-Specific Integrated Circuit)) that performs a corresponding function or action, or may be implemented by a combination of hardware and software, for example, firmware.

Although the present application is described with reference to embodiments, in a process of implementing the present application that claims protection, a person skilled in the art may understand and implement another variation of the disclosed embodiments by viewing the accompanying drawings, the disclosed content, and the accompanying claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce better effect.

Embodiments of this application are described above. The foregoing descriptions are examples, are not exhaustive, and are not limited to the disclosed embodiments. Many modifications and changes are clear to a person of ordinary skill in the art without departing from the scope of the described embodiments. The selection of terms used in this specification is intended to best explain the principles of embodiments, practical application, or improvements to technologies in the market, or to enable another person of ordinary skill in the art to understand embodiments disclosed in this specification.

What is claimed is:

1. A roadside passing control apparatus comprising at least one processor and at least one memory coupled to the at least one processor, wherein the at least one memory stores program instructions for execution by the at least one processor to cause the apparatus to:

send, to a vehicle at a first power, a payment inquiry message for requesting payment voucher information of the vehicle that has completed a payment of a toll for passing through a gate without actually passing through the gate, wherein the first power is less than a second power at which a payment interaction message is sent for collecting the toll from the vehicle;

receive, from the vehicle, a payment response message corresponding to the payment inquiry message, wherein the payment response message comprises the payment voucher information; and generate, based on the payment response message, a passing control signal for controlling the gate to release the vehicle.

2. The apparatus according to claim 1, wherein the payment voucher information is a first toll collection voucher received after the vehicle pays the toll and wherein the program instructions are for execution by the at least one processor to cause the apparatus to:
store a second toll collection voucher; and
generate the passing control signal based on determining that the first toll collection voucher is consistent with the second toll collection voucher.

3. The apparatus according to claim 1, wherein the payment voucher information is a first vehicle identification number and wherein the program instructions are for execution by the at least one processor to cause the apparatus to:
store a second vehicle identification number; and
generate the passing control signal based on determining that the first vehicle identification number is consistent with the second vehicle identification number.

4. The apparatus according to claim 1, wherein the payment inquiry message comprises at least one of a roadside device identifier, a toll station identifier, a gate identifier, or a random code.

5. The apparatus according to claim 1, wherein the payment inquiry message and the payment response message comprises a random code.

6. The apparatus according to claim 1, wherein the program instructions are for execution by the at least one processor to cause the apparatus to:
send a release confirmation message to the vehicle.

7. The apparatus according to claim 1, wherein the payment inquiry message is a broadcast message that is periodically sent.

8. The apparatus according to claim 7, wherein a sending periodicity of the payment inquiry message is determined based on a road speed limit or a vehicle flow rate.

9. The apparatus according to claim 1, wherein the program instructions are for execution by the at least one processor to cause the apparatus to:
send the payment interaction message to the vehicle at the second power, wherein the payment interaction message and the payment inquiry message are sent through frequency division or time division.

10. A passing control apparatus of a vehicle comprising at least one processor and at least one memory coupled to the at least one processor, wherein the at least one memory stores program instructions for execution by the at least one processor to cause the apparatus to:
receive, from a roadside apparatus, a first signal at a first power that carries a payment inquiry message for requesting payment voucher information of the vehicle that has completed a payment of a toll for passing through a gate without actually passing through the gate;
receive, from the roadside apparatus, a second signal at a second power that carries a payment interaction message for collecting the toll from the vehicle, wherein the second signal is higher than the first power; and
send, based on the payment inquiry message, a payment response message comprising the payment voucher information to the roadside apparatus, wherein the roadside apparatus generates a passing control signal for controlling the gate to release the vehicle.

11. The apparatus according to claim 10, wherein the program instructions are for execution by the at least one processor to cause the apparatus to:
receive a toll collection voucher after the vehicle pays the toll, wherein the payment voucher information is the toll collection voucher.

12. The apparatus according to claim 10, wherein the payment voucher information is a vehicle identification number of the vehicle, and wherein the program instructions are for execution by the at least one processor to cause the apparatus to:
send the vehicle identification number to the roadside apparatus after the vehicle pays the toll.

13. The apparatus according to claim 10, wherein the payment inquiry message comprises at least one of a roadside device identifier, a toll station identifier, a gate identifier, or a random code.

14. The apparatus according to claim 10, wherein the payment inquiry message and the payment response message comprises a random code.

15. The apparatus according to claim 10, wherein sending the payment response message comprises repeatedly sending the payment response message for a plurality of times, and wherein the program instructions are for execution by the at least one processor to cause the apparatus to:
receive a release confirmation message from the roadside apparatus; and
stop sending the payment response message based on the release confirmation message.

16. A passing control method comprising:
receiving, from a roadside apparatus, a first signal at a first power that carries a payment inquiry message for requesting payment voucher information of the vehicle that has completed a payment of a toll for passing through a gate without actually passing through the gate;
receiving, from the roadside apparatus, a second signal at a second power that carries a payment interaction message for collecting the toll from the vehicle, wherein the second signal is higher than the first power; and
sending, based on the payment inquiry message, a payment response message comprising the payment voucher information to the roadside apparatus, wherein the roadside apparatus generates a passing control signal for controlling the gate to release the vehicle.

17. The method according to claim 16, wherein the method further comprises:
receiving a toll collection voucher after the vehicle pays the toll, wherein the payment voucher information is the toll collection voucher.

18. The method according to claim 16, wherein the payment voucher information is a vehicle identification number of the vehicle, and the method further comprises:
sending the vehicle identification number to the roadside apparatus after the vehicle pays the toll.

19. The method according to claim 16, wherein the payment inquiry message comprises at least one of a roadside device identifier, a toll station identifier, a gate identifier, or a random code.

20. The method according to claim 16, wherein the payment inquiry message and the payment response message comprises a random code.

* * * * *